(12) United States Patent
Fuerstenau et al.

(10) Patent No.: US 7,311,786 B2
(45) Date of Patent: Dec. 25, 2007

(54) PASSIVATION OF SULFIDIC IRON-CONTAINING ROCK

(75) Inventors: Maurice C. Fuerstenau, Reno, NV (US); Manoranjan Misra, Reno, NV (US); Stefan Beck, Reno, NV (US)

(73) Assignee: University and Community College System of Nevada on Behalf of The University of Nevada, Reno, Reno, NV (US)

( * ) Notice: Subject to any disclaimer, the term of this patent is extended or adjusted under 35 U.S.C. 154(b) by 545 days.

(21) Appl. No.: 10/842,007

(22) Filed: May 6, 2004

(65) Prior Publication Data

US 2005/0103402 A1  May 19, 2005

Related U.S. Application Data

(63) Continuation-in-part of application No. 10/192,822, filed on Jul. 9, 2002, now Pat. No. 7,008,606.

(60) Provisional application No. 60/468,725, filed on May 6, 2003, provisional application No. 60/304,599, filed on Jul. 10, 2001.

(51) Int. Cl.
   *C22B 1/11* (2006.01)
(52) U.S. Cl. .................... 148/273; 75/743
(58) Field of Classification Search .......... 75/743; 148/273
   See application file for complete search history.

(56) References Cited

U.S. PATENT DOCUMENTS

| | | | |
|---|---|---|---|
| 3,941,622 A | 3/1976 | Lee et al. ................. | 148/27 |
| 4,552,589 A * | 11/1985 | Mason et al. ............. | 423/30 |
| 4,565,549 A | 1/1986 | Mathiesen et al. ....... | 44/280 |
| 5,037,479 A | 8/1991 | Stanforth ................. | 106/691 |
| 5,587,001 A | 12/1996 | De Vries .................. | 75/743 |
| 5,603,838 A | 2/1997 | Misra et al. ............. | 210/665 |
| 6,086,847 A | 7/2000 | Thompson | |
| 6,197,201 B1 | 3/2001 | Misra et al. ............. | 210/721 |

OTHER PUBLICATIONS

Caruccio, F.T., Geidel, G., Pelletier, M., (1981) "Occurrence and predication of acid drainage". J. of the Energy Division, ASCE, 107(1):167-178.

Doyle, F.M. and Mirza, A.H. (1990) "Understanding the mechanisms and kinetics of pyrite wastes" Proceedings of the Western Regional Symposium on Mining and Mineral Processing pp. 43-51.

Evangelou, V. P., (1998) "Pyrite Chemistry: The Key for Abatement of Acid Mine Drainage" Acidic Mining Lakes: Acid mine Drainage, Limnology and Reclamation Springer-Verlac, pp. 197-222.

Huang, X. and Evangelou, V.P. (1992) Abatement of acid mine drainage by encapsulation of acid producing geological materials, US Bureau of Mines, Contract No. J0309013, pp. 1-60 (abstract only).

(Continued)

*Primary Examiner*—George P. Wyszomierski
(74) *Attorney, Agent, or Firm*—Greenlee, Winner and Sullivan, P.C.

(57) ABSTRACT

A method for passivating sulfidic iron-containing rock comprising: contacting sulfidic iron-containing rock with a magnesium-containing substance, a manganese-containing substance, and a calcium-containing substance; and adjusting the pH of the system to below about 11, is provided. The method can be used to prevent acid rock drainage of metal-bearing rocks or to produce a pretreated ore or rock which can be contacted with a lixiviating agent to extract metals from the pretreated ore or rock.

7 Claims, 20 Drawing Sheets

OTHER PUBLICATIONS

Kleinmann, R. L. P., (Jul. 1989) "Acid mine drainage: US Bureau of Mines researches and develops control methods for both coal and metal mines" Engineering Mining Journal 161-164.

Marshall, G.P., J.S. Thompson, and R.E. Jenkins, (1998) "New technology for the prevention of acid rock drainage". Proceedings of the Randol Gold and Silver Forum, pp. 203-206.

Sobek, A. A., Schuller, W. A., Freeman, J.R., and Smith, R.M., (1978) Field and laboratory methods applicable to overburden mine soils. EPA 600/2-78-054.

Mehta, et al., Development of a process to prevent acid generation from waste rock and mine tailings, Environmental Issues and Management of Waste in Energy and Mineral Production, Proceedings of the International Conference on Environmental Issues and Mineral Production, 6$^{th}$, Calgary, AB, Canada, May 30-Jun. 2, 2000, pp. 577-580.

S. Beck, "Passivation of weathered and fresh sulfidic rock," Thesis, University of Nevada, Reno, 55 pp., May 2003.

S. Chen, Songyuan, "Control of acid mine drainage by passivation of reactive acid generating materials," A dissertation for the degree of Doctor of Philosophy in Metallurgical Engineering, University of Nevada, Reno, 107 pp., 2001.

V. P. Evangelou, "Pyrite oxidation and its control", CRC press, pp. 193, 1995.

V. P. Evangelou et al., "Acid mine drainage," Encyclopedia of Environmental Analysis and Remediation, Robert A. Meyers, editor, John Wiley and Sons, Inc., pp. 1-17, 1998.

V. P. Evangelou, "Pyrite chemistry: The key for abatement of acid mine drainage," Acidic Mining Lakes: Acid Mine Drainage, Limnology and Reclamation, Springer-Verlac, pp. 197-222, 235, 1998.

C. J. Lewis et al., "Acid neutralization with lime for environmental control and manufacturing processes," Bulletin No. 216, Arlington, Virginia, National Lime Association, 16 pp., 1995.

R. Mehta et al., "Development of a process to prevent acid generation from waste rock and mine tailing," Environmental Issues and Management of Waste in Energy and Mineral Production, Proceedings of the International Conference on Environmental Issues and Mineral Production, 6$^{th}$, Calgary, AB, Canada, pp. 577-580 (Abstract only), May 30-Jun. 2, 2000.

C. Mills et al., Acid Rock Drainage at Environmine [online], [retrieved on Jul. 1, 2004], Retrieved from the Internet, <url:http://technology.infomine.com/enviromine/ard/home.htm>.

PDG, Placer Dome Operations: Golden Sunlight [online], 2001 [retrieved on Jul. 1, 2004], Retrieved from the Internet: <url:http://www.placerdome.com/operations/goldensunlight/goldensun.htlml>.

V. Rastogi, "Water quality and reclamation management in mining using bactericides," Mining Engineering 48:71-76, Apr. 1996.

M. Sengupta, "Environmental impacts of mining: Monitoring, restoration, and control," Lewis Publishers, Boca Raton, pp. 121-259, 1993.

P. C. Singer et al., "Acidic mine drainage: The rate-determining step," Science 167:1121-1123, Feb. 1970.

J. Skousen et al., "Handbook of technologies for avoidance and remediation of acid mine drainage," The National Mine Land Reclamation Center, Morgantown, West Virginia, 131 pp., Jun. 1, 1998.

J. G. Skousen et al., "Acid mine drainage: Control and treatment," Second Edition, Morgantown, West Virginia, West Virginia University and the National Mine Land Reclamation Center, pp. 151-247, 1996.

W. Stumm et al., Aquatic Chemistry: An Introduction Emphasizing Chemical Equilibria in Natural Waters, John Wiley and Sons, New York, pp. 238-299, 383-563, 1970.

J. S. Thompson et al., DuPont Passivation Technology Chemistry and Application, Internal DuPont Publication, 195 pps., 1998.

* cited by examiner

PASSIVATION OF SULFIDIC IRON-CONTAINING ROCK

CROSS-REFERENCE TO RELATED APPLICATIONS

This application takes priority to U.S. provisional application Ser. No. 60/468,725, filed May 6, 2003, which application is hereby incorporated by reference to the extent not inconsistent with the disclosure herewith. This application is a continuation-in-part of U.S. application Ser. No. 10/192,822, filed Jul. 9, 2002, now U.S. Pat. No. 7,008,606 which application takes priority to U.S. provisional application Ser. No. 60/304,599, filed Jul. 10, 2001, which applications are hereby incorporated by reference to the extent not inconsistent with the disclosure herewith.

BACKGROUND OF THE INVENTION

This invention is in the field of reducing or eliminating acid rock drainage from sulfidic iron containing rocks and acidic mine waste tailings. Acid rock drainage (formation of sulfuric acid and related acids from natural air/water oxidation processes on various materials) is a common phenomenon from mining and leaching of various metallic and non-metallic minerals such as iron-containing sulfidic materials. These sulfidic materials include tailings, overburden, discarded waste rock and unmined exposed rock. Acid rock drainage causes severe pollution problems throughout the world.

More specifically, in mining operations large amounts of rock containing sulfide minerals are typically excavated in an open pit or opened up in an underground mine. This rock, in turn, can react with water and oxygen to produce sulfuric acid and related acids. When the water reaches a certain level of acidity, naturally-occurring bacteria called *Thiobacillus feroxidans* may become active and accelerate the oxidation and acidification processes, leaching even more trace metals from the wastes. The acid will leach from the rock as long as its source rock is exposed to air and water and until the sulfides are leached out—a process that can last hundreds to thousands of years. Rainwater or surface drainage can carry acid from the minesite and deposit it into nearby streams, lakes, rivers, and groundwater. Acid rock drainage (AD) severely degrades surface and groundwater quality and can strongly affect the ecosystems of lakes, streams, and estuaries.

Heavy metal pollution is caused when such metals as cobalt, cadmium, lead, copper, silver, zinc, and arsenic that can occur naturally in excavated rock are exposed in a mine and come in contact with water. As water flows over the rock surface, metals can be leached out and carried downstream. Although metals can become mobile in neutral pH conditions, leaching is particularly accelerated in the low pH conditions that are created by acid rock drainage.

According to U.S. Bureau of Mines estimates in 1989, coal and metal mines and the associated piles of mine wastes alone adversely affected over 19,000 kilometers of rivers and streams and over 73,000 hectares of lakes and reservoirs in the United States. The prevention and treatment of AD requires large sums of money. In one of the largest coal-producing states in the country, West Virginia, approximately $350 million per year is spent to treat AD. In addition to direct costs, there are additional costs that are attributed to diminishing land and water quality.

Mining activities at base and precious metal, uranium, diamond, and coal mines produce acid drainage by the oxidation of sulfide minerals, primarily pyrite ($FeS_2$) and marcasite ($FeS_2$). Other important metal sulfides which can occur in mining regions can include:

| | |
|---|---|
| $MoS_2$ | molybdenite |
| $Fe_xS_x$ | pyrrhotite |
| $Cu_2S$ | chalcocite |
| $CuS$ | covellite |
| $CuFeS_2$ | chalcopyrite |
| $NiS$ | millerite |
| $PbS$ | galena |
| $ZnS$ | sphalerite |
| $FeAsS$ | arsenopyrite |

Sulfide minerals oxidize to form highly acidic sulfate-rich drainage in the presence of oxygen and water. Releases of acid drainage in the environment occur as runoff or seepage from waste rock stockpiles, tailings impoundments, spent heap leach ore and open pit walls or as groundwater discharge from mine adits.

The chemical reactions governing the oxidation of pyrite and subsequent acid generation have been presented as:

$$FeS_{2(s)} + \frac{7}{2}O_2 + H_2O \rightarrow Fe^{+2}_{(aq)} + 2SO^{-2}_{4(aq)} + 2H^+ \quad (1)$$

$$Fe^{+2}_{(aq)} + \frac{1}{4}O_2 + H^+ \rightarrow Fe^{+3}_{(aq)} + \frac{1}{2}H_2O \quad (2)$$

$$Fe^{+3}_{(aq)} + 3H_2O \rightarrow Fe(OH)_{3(s)} + 3H^+ \quad (3)$$

$$FeS_{2(s)} + 14Fe^{+3}_{(aq)} + 8H_2O \rightarrow 15Fe^{+2}_{(aq)} + 2SO_4^{-2}_{(aq)} + 16H^+ \quad (4)$$

Equation 2 describes the oxidation of ferrous ($Fe^{+2}$) to ferric ($Fe^{+3}$) iron and is also the rate-limiting step in the oxidation of pyrite. *Thiobacillus ferroxidans* and probably other oxidizing bacteria act as catalysts during this reaction, increasing overall oxidation rates of ferrous iron by several orders of magnitude. Once ferrous iron is oxidized to ferric iron, the ferric ion can react with pyrite in Equation 4 to produce greater amounts of acidity than Equation 1 in which oxygen is the oxidizing agent.

Many approaches have been suggested to solve the AD problem. These approaches include using techniques to eliminate oxygen, sulfides or water to control acid generation at its source; encapsulating or coating the pyrite; using bactericides; neutralizing acid drainage from groundwater and surface water sources using limestone, quicklime or slaked lime; creating aerobic or anaerobic wetlands to treat acidic water; and using diversion wells or open limestone channels to passively treat AD. These methods of treating materials have been at best only partially effective and economically unattractive.

U.S. Pat. No. 5,587,001 (DeVries, Dec. 24, 1996) describes a method for reducing acid rock drainage from sulfidic iron-containing rock by contacting the rock with an aqueous solution of permanganate ion at a pH between 6-13. This treatment reportedly creates a manganese oxide layer on the iron-containing sulfidic rock. The process in the U.S. Pat. No. 5,587,001 requires pH 6-13 at all times during the treatment, preferably a pH greater than 10. U.S. Pat. No. 5,587,001 also requires that permanganata color be maintained during the treatment. This condition often requires high dosage of permanganate ions for treating reactive tailings because a considerable amount of permanganate ions are dissolved in solution and react with other ions before reaching the sulfide surface. U.S. Pat. No. 5,587,001 also requires that the sulfides contain a significant concentration of iron bearing minerals so that the reaction between iron bearing sulfides and permanganate ions can be sustained. Several dissolved metals undergo precipitation reactions at pH>12. Precipitated metal hydroxycomplexes coat the sulfides, thus preventing the desired electrochemical reaction. Some problems associated with this process involve the addition of large amounts of lime to maintain a pH of 12. The amount of potassium permanganate required to form a stable coating on sulfide minerals in the treatment of waste rocks and tailings can result in high costs. Further, there is the problem of working with a very strong oxidant.

U.S. Pat. No. 6,086,847 (Thompson, Jul. 11, 2000) discloses a process for reportedly preventing acid rock drainage of metal-bearing rocks comprising contacting a sulfidic iron-containing rock with an acid passivating agent which comprises at least one alkaline earth metal to produce a combination; contacting the combination with manganate ions and a base and maintaining the pH of the system between 11 and 13.5.

The waste rock naturally yields very low acidic pH in the range of 1-4. To raise the pH and maintain it at a higher level than is naturally found (such as the pH required by the process disclosed in U.S. Pat. Nos. 5,587,001 and 6,086,847) requires high dosage of neutralization agents (for example, lime/caustic soda). This is not economically and technically viable. Also, at high pH (above about 11.0), gypsum ($CaSO_4$) and $MgSO_4$ precipitate on the sulfide and affect the coating of desired materials. Improved and cost effective treatments are necessary to treat iron containing sulfidic minerals to prevent or minimize the natural oxidation of these materials to form acids.

SUMMARY OF THE INVENTION

A method for passivating sulfidic iron-containing rock and mine wastes is provided. This method is useful to reduce the amount of acid rock drainage from mine waste tailings and other areas where formation of acid products is a problem, among other uses. The process disclosed herein is independent of the concentration of iron sulfide in the materials to be treated and the physical state of materials.

As used herein, "passivating" means rendering the substance passivated less reactive than it was before passivation. For example, a passivated sulfidic iron-containing ore is an ore that generates no acid or less acid than a non-passivated ore upon being exposed to acid-generating and/or weathering processes. An "effective amount" is an amount that gives the desired effect, as taught herein.

In one embodiment, the process of this invention for passivating sulfidic iron-containing rock comprises the steps of:

contacting said rock with a magnesium-containing substance, a manganese-containing substance and a calcium-containing substance; if necessary, adjusting the pH to the desired value. In one embodiment, the desired value is pH below about 11. The pH may be adjusted at any stage of the process, and the steps may be performed in any order.

The magnesium-containing substance used can be any suitable substance or composition such as one or more members of the group consisting of magnesium oxide, magnesium hydroxide, magnesium chloride, magnesium nitrate and magnesium carbonate. In addition, any suitable form can be used. For example, an aqueous saturated or other concentration solution may be used, or a dry solid may be used. Preferably the magnesium-containing substance is magnesium oxide or magnesium hydroxide.

The manganese-containing substance used can be any suitable substance or composition such as one or more members of the group consisting of manganous fluoride, manganous chloride, manganous bromide, manganese oxide, manganese iodide, manganese sulfide, potassium permanganate, manganous nitrate, manganous sulfate, manganese tetroxide, and manganese dioxide. In addition, any suitable form can be used. For example, an aqueous saturated or other concentration solution may be used, or a dry solid may be used. Preferably the manganese-containing substance is potassium permanganate or manganous sulfate or manganous nitrate.

The calcium-containing substance used can be any suitable substance or composition such as one or more members of the group consisting of a calcium halide, a calcium oxide, and a calcium nitrate. In addition, any suitable form can be used. For example, an aqueous saturated or other concentration solution may be used, or a dry solid may be used. Preferably the calcium-containing substance is calcium oxide. The calcium-containing substance may also be replaced with a beryllium-containing substance or a strontium-containing substance.

The useful concentration of the magnesium-, manganese-, and calcium-containing substance is any concentration that causes the desired level of passivation of the rock. The useful concentration is determined by methods known by one of ordinary skill in the art with the description provided herein. Some useful concentrations of the magnesium-containing substance are: at least about 0.08 kg Mg-containing substance/ton solution, at least about 0.1 kg Mg-containing substance/ton solution, at least about 0.15 Mg-containing substance/ton solution, at least about 0.2 kg Mg-containing substance/ton solution, at least about 0.25 kg Mg-containing substance/ton solution, at least about 0.3 kg Mg-containing substance/ton solution, at least about 0.4 kg Mg-containing substance/ton solution, at least about 0.5 kg Mg-containing substance/ton solution, at least about 0.6 kg Mg-containing substance/ton solution, at least about 0.7 kg Mg-containing substance/ton solution, at least about 0.8 kg Mg-containing substance/ton solution, at least about 1 kg Mg-containing substance/ton solution, at least about 1.5 kg Mg-containing substance/ton solution, at least about 2 kg Mg-containing substance/ton solution, at least about 2.5 kg Mg-containing substance/ton solution, at least about 3 kg Mg-containing substance/ton solution and all individual values and ranges therein. The Mg-containing substance is described further herein. One example of the Mg-containing substance is a Mg salt. One example of a Mg salt is MgO. Other examples are known in the art.

Some useful concentrations of the manganese-containing substance are: at least about 0.08 kg Mn-containing substance/ton solution, at least about 0.1 kg Mn-containing substance/ton solution, at least about 0.15 Mn-containing substance/ton solution, at least about 0.2 kg Mn-containing substance/ton solution, at least about 0.25 kg Mn-containing substance/ton solution, at least about 0.3 kg Mn-containing substance/ton solution, at least about 0.4 kg Mn-containing substance/ton solution, at least about 0.5 kg Mn-containing substance/ton solution, at least about 0.6 kg Mn-containing substance/ton solution, at least about 0.7 kg Mn-containing substance/ton solution, at least about 0.8 kg Mn-containing substance/ton solution, at least about 1 kg Mn-containing substance/ton solution, at least about 1.5 kg Mn-containing substance/ton solution, at least about 2 kg Mn-containing substance/ton solution, at least about 2.5 kg Mn-containing substance/ton solution, at least about 3 kg Mn salt/ton solution and all individual values and ranges therein. The Mn-containing substance is described further herein. One example of the Mn-containing substance is a Mn salt. One embodiment of a Mn salt is $KMnO_4$. Another embodiment of a Mn salt is $Mn(SO_4)_2 \cdot H_2O$. Other examples are known in the art.

Some useful concentrations of the calcium-containing substance are: at least about 0.08 kg Ca-containing substance/ton solution, at least about 0.1 kg Ca-containing substance/ton solution, at least about 0.15 Ca-containing substance/ton solution, at least about 0.2 kg Ca-containing substance/ton solution, at least about 0.25 kg Ca-containing substance/ton solution, at least about 0.3 kg Ca-containing substance/ton solution, at least about 0.4 kg Ca-containing substance/ton solution, at least about 0.5 kg Ca-containing substance/ton solution, at least about 0.6 kg Ca-containing substance/ton solution, at least about 0.7 kg Ca-containing substance/ton solution, at least about 0.8 kg Ca-containing substance/ton solution, at least about 1 kg Ca-containing substance/ton solution, at least about 1.5 kg Ca-containing substance/ton solution, at least about 2 kg Ca-containing substance/ton solution, at least about 2.5 kg Ca-containing substance/ton solution, at least about 3 kg Ca-containing substance/ton solution and all individual values and ranges therein. The Ca-containing substance is described further herein. One example of a Ca-containing substance is a calcium salt. One embodiment of a calcium salt is CaO. Other examples are known in the art.

All individual pH values are included in this disclosure. In one embodiment, this includes all individual pH values and ranges below about 11 and around about 11. These values and ranges include below about 11, below about 10.8, below about 10.5, below about 10, below about 9.8, between about 11 and about 10.5, between about 11.1 and about 10.9, between about 11.2 and about 10.8, between about 9 and about 11, and between about 11 and about 10. In addition, included are all individual pH values and ranges below about 12 and around about 12. In addition, included are all individual pH values and ranges below about 10 and around about 10. In addition, included are all individual pH values and ranges below about 10.5 and around about 10.5. In addition, included are all individual pH values and ranges below about 11.5 and around about 11.5. In addition, included are all individual pH values and ranges below about 9 and around about 9. In addition, included are all individual pH values and ranges below about 9.5 and around about 9.5.

As known in the art, the elements magnesium, manganese and calcium occur in different oxidation states. For example, manganese typically occurs in the 0, +1, +2, +3, or +7 oxidation state. Magnesium typically occurs in the +2 or 0 oxidation state. Calcium typically occurs in the +2 or 0 oxidation state. Magnesium-, manganese-, and calcium-containing substances containing any oxidation state or substances containing any mixture of possible oxidation states of the elements are intended to be included in this disclosure.

As used herein, "about" is intended to indicate the uncertainty inherent in any measurement, and is ±5%. As used herein, "around" a particular value is intended to indicate a range encompassing the particular value. As used herein, "contacting" substances means placing the substances sufficiently near each other so that the desired reaction can occur.

Preferably, the rock and reagents are reacted in the form of a slurry. The rock can be directly treated in the natural environment, for example, by spraying a solution as described herein on a rock surface, or as crushed rock preferably containing about 20%-50% by weight of solids, but any concentration or range of concentrations which allows the desired reaction to occur at a desired rate is included in this description.

pH adjustment with substances such as acids or bases is well known in the art. Some useful acids are hydrochloric acid, sulfuric acid, nitric acid, and others known in the art. Some useful bases are sodium hydroxide, calcium hydroxide, and others known in the art.

The manganese-containing substance, magnesium-containing substance and calcium-containing substance can be added to the rock in any order or all at once. In addition, any or all of the manganese-containing substance, magnesium-containing substance and calcium-containing substance can be added at once, or any or all of the manganese-containing substance, magnesium-containing substance and calcium-containing substance may be added in separate portions, in any order.

DETAILED DESCRIPTION OF THE INVENTION

Figure 1:
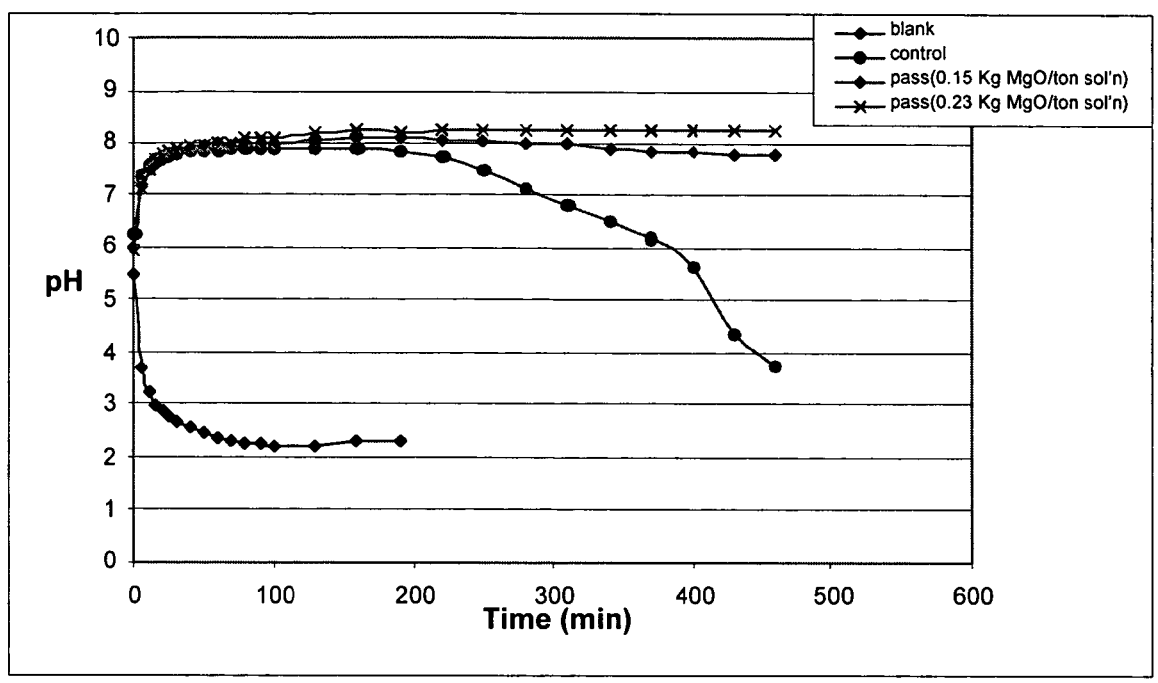
FIG. 1 shows blank, control and passivation of weathered rock.

The ores that may be treated using the method of the invention include pyrrhotite, bornite, chalcopyrite, arsenopyrite and pyrite. Any ore that contains iron and sulfur in its reduced form (sulfide) may be treated to passivate the sulfur using the disclosed process. The ore may be in any form, for example, slurry, rock pile or exposed rock.

The reaction proceeds for a suitable time required to achieve the desired amount of passivation of the ore. This time naturally depends on the nature of the ore treated, the desired amount of passivation of the rock and other parameters, such as concentration of reactants used. This time is readily determined by routine experimentation well within the skill of one of ordinary skill in the art without undue experimentation, using the teachings herein.

The processes of this invention can be carried out at temperatures above the freezing point of the solutions up to about 60° C.

Applicant does not wish to be bound by any theory presented herein. The theory and examples below are presented to aid in the understanding of the invention and illustrating some of the presently-preferred embodiments of the invention.

Experimental Materials: The materials used in the study were sulfidic rock, reagent-grade potassium permanganate, reagent-grade manganous sulfate ($Mn(SO_4)_2 \cdot H_2O$) and reagent-grade magnesium oxide. Calcium oxide and sodium hydroxide were used. Sulfidic rock: Fresh and weathered sulfidic rock was obtained from The Golden Sunlight mine located in Jefferson County in southwestern Montana approximately 55 kilometers east of Butte. The Golden Sunlight Mine property is located on the eastern flank of the fault-bounded Bull Mountain range. During the Cretaceous Period, Proterozoic clastic sedimentary rocks were deposited by latite magmas. The main orebody is the Mineral Hill orebody and contains gold mineralization that occurs within and around a 200-meter diameter breccia pipe which cuts sedimentary and igneous rocks. The Mineral Hill ore body contains gold that occurs primarily as disseminated and structurally-controlled micro-sized particles of free gold and gold tellurides. Based on mineralogical studies, precious metal mineralization in the Mineral Hill porphyry system contains: Au, Ag, Te, Bi, Cu, Fe and Ba.

Weathered material was obtained from a bench high up on the Southwestern edge of the pit. The material consisted of blasted waste rock and was probably mined more than 10 years ago. Fresh material was obtained from the west side of the pit near the current ore zone (about 800 feet below the elevation of the location of the weathered rock). This excavation is done using pre-splitting and fine rock fragments were obtained from the waste rock samples off the bench.

Experimental Methods

General procedure: The general procedure for testing the effectiveness of passivation was:
Three types of samples were prepared and tested
1. Blank: A sample of the rock was tested without any preparation. This test provides an indication of the acid producing capability of the ore.
2. Control: The pH of a rock sample was adjusted to that required by the procedure (see discussion below).
3. Passivation: The pH of a rock sample was adjusted and passivation chemicals were added (as discussed below). Passivation experiments are designated "pass" in the Figures herein. This test indicated the success or failure of the passivation procedure. A success of the passivation procedure was found when the pH of the sample was above 7 as long as the test was monitored.

In all of the tests, the following parameters were the same:
1. Sample preparation always consisted of
   10-g of ¼ in. passing rock sample
   20-ml DI water
2. Unless noted, the hydrogen peroxide test always consisted of
   10-g rock sample
   85-ml DI water and 15 ml (30% hydrogen peroxide)

Blank Sample (Refer to Scheme 1)
  (I) Sample Preparation Procedure
    1. 10-g of ¼ in. passing rock sample
    2. Add 20-ml DI water
    3. Monitor the pH for three hours
    4. Wash and filter the sample
  (II) Hydrogen Peroxide Test Procedure
    1. Add 85-ml DI water and 15-ml of 30% hydrogen peroxide
    2. Monitor the pH as a function of time.

Control Sample (Refer to Scheme 2)
  (I) Sample Preparation Procedure: This Procedure is Modified at Times and Noted in the Following Listing.
    1. 10-g of ¼ in. passing rock sample
    2. Add 20-ml DI water
    3. Add a predetermined amount of CaO to reach a target pH.
    4. Add NaOH if necessary to reach a target pH and to maintain a target pH.
    5. Monitor pH for three hours
    6. Wash and filter the sample (II) Hydrogen Peroxide Test Procedure
    1. Add 85-ml DI water and 15-ml of 30% hydrogen peroxide solution
    2. Monitor pH as a function of time Passivation Sample Procedure Using Potassium Permanganate (Refer to Scheme 3)
  (I) Sample Preparation Procedure: This Procedure also will be Modified at Times and will be Noted in the Recipe Table.
    1. 10-g of ¼ in. passing rock sample
    2. Add 20-ml DI water
    3. Add a predetermined amount of CaO and MgO
    4. Adjust pH to 12 with NaOH
    5. Add 0.01% potassium permanganate (0.1-g $KMnO_4$ per 1-liter DI water)
    6. Monitor pH for three hours
    7. Filter and wash sample (II) Hydrogen Peroxide Test Procedure
    1. Add 85-ml DI water and 15-ml of 30% hydrogen peroxide solution
    2. Monitor pH as a function of time Passivation Sample Procedure Using Manganous Sulfate (Refer to Scheme 4)
  (I) Sample Preparation Procedure: This Procedure also will be Modified at Times and will be Noted in the Recipe Table.
    1. 10-g of ¼ in. passing rock sample
    2. Add 20-ml DI water
    3. Add a predetermined amount of CaO and MgO 4. Adjust pH to 12 with NaOH
5. Add manganous sulfate. Change this as necessary
6. Monitor pH for three hours
7. Filter and wash sample (II) Hydrogen Peroxide Test Procedure
1. Add 85-ml DI water and 15-ml of 30% hydrogen peroxide solution
2. Monitor pH as a function of time Terminology:
Fresh rock: 10-g of ¼ in. passing rock sample (the rock passes through a ¼ inch opening).
Weathered rock: The weathered rock sample of ¼ in. passing material was placed in a No. 40 USA Standard testing sieve. The ore was then vigorously washed with tap water with a hose in the lab sink for several minutes. This removes much of the weathering products from the weathered sample.

Scheme 1
Experimental Procedure for Conducting Blank Test

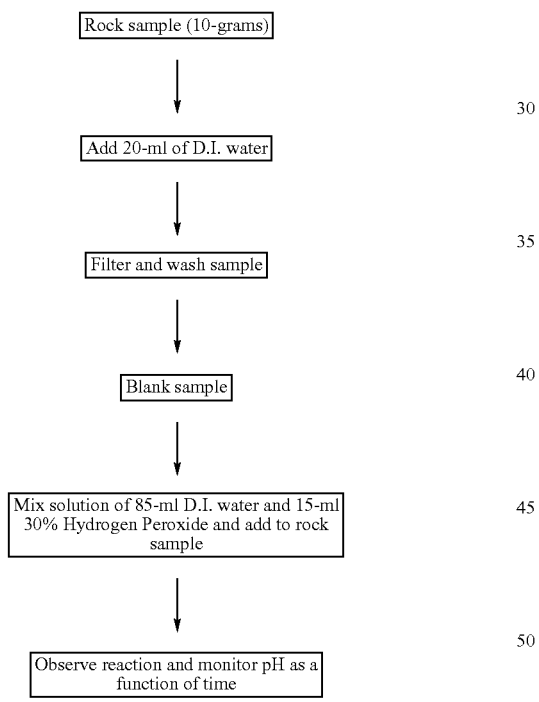

Scheme 2
Experimental Procedure for Conducting Control Test

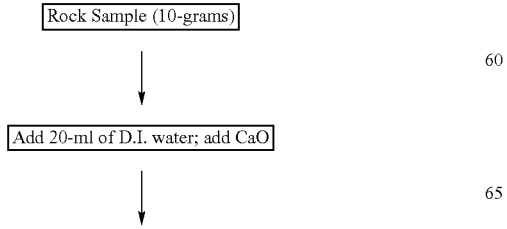

-continued

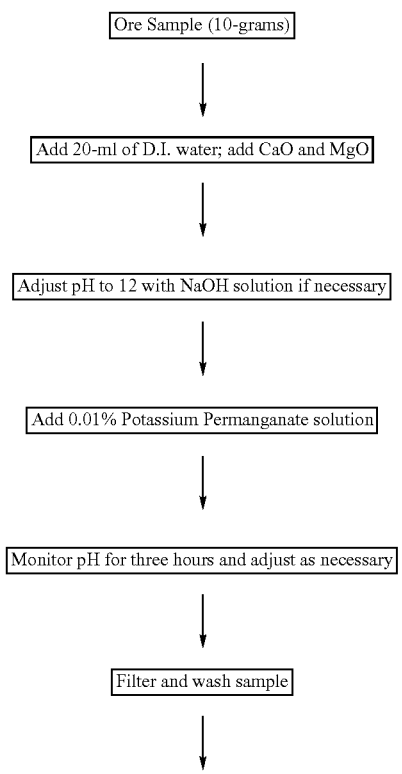

Scheme 3
Experimental Procedure for Conducting Passivation Test with Permanganate -continued

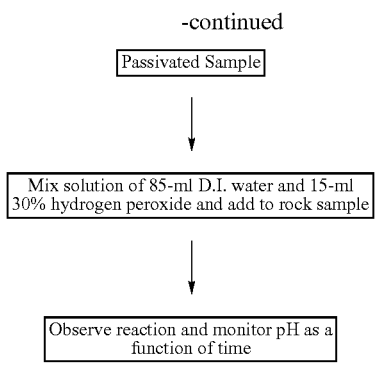

Scheme 4
Experimental Procedure for conducting Passivation Test with Manganous Sulfate

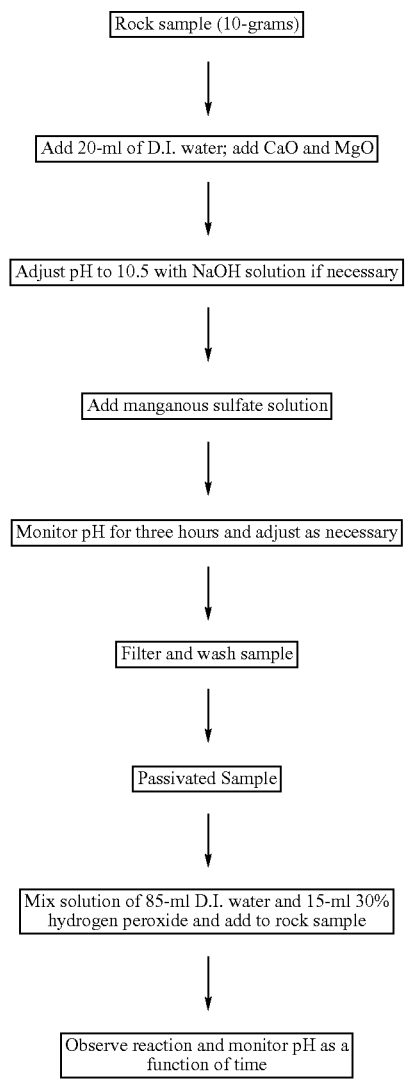

The experimental results are divided into two sections denoted by manganese additions, i.e., potassium permanganate and manganese salts.

In each section the results are shown in graphical form. A table precedes each graph to provide information on experimental conditions. The tables are organized as follows:

1. The first column contains various parameters:
   Chemicals used. The chemicals used are described above. In the case of permanganate sufficient amounts were added to maintain a magenta color. In some cases, e.g. Table 4, the differences in the amount of permanganate is due to maintaining a magenta color during the test.
   pH data. The pH data refers to the initial and final pH during the passivation step. Variation occurred during this time period as the acidity of the sample increased and the pH was adjusted with sodium hydroxide.
   Run time. This is the time period for the passivation step of the test and always consisted of 180 minutes contact time of the rock sample and the passivation chemicals. It is known in the art this parameter can be altered as desired to achieve the desired passivation level.
2. The remainder columns information to identify the variable that is changed in the passivation tests.
3. The rows contain data information.

Weathered rock samples were used for the potassium permanganate testing and fresh rock samples were used for the manganous salt testing. In the description provided, an amount of substance per ton indicates per ton of solution. For example, in Table 1, the description "CaO Kg/ton" indicates the listed amount of CaO per ton of solution was used. In addition, the description "Kg/ton MgO" indicates the listed amount of MgO per ton solution, for example.

Potassium Permanganate

The first series of experiments involved studying the effect of MgO addition while maintaining the other parameters constant. The addition of CaO was 0.52 Kg CaO/ton solution and 0.05 Kg $KMnO_4$/ton solution. Initial pH was 11.5. As shown in FIG. 1, passivation is achieved with the addition of 0.15 Kg MgO/ton solution and 0.23 Kg MgO/ton solution.

The results of the blank and control tests are also shown to demonstrate that the rock sample generates acid.

TABLE 1

Conditions for FIG. 1

| Sample | Passivation (0.15 Kg MgO/ton solution) | Passivation (0.23 Kg MgO/ton solution) |
|---|---|---|
| $KMnO_4$ Kg/ton solution | 0.05 | 0.05 |
| CaO Kg/ton | 0.52 | 0.52 |
| MgO Kg/ton | 0.15 | 0.23 |
| Initial pH | 11.5 | 11.5 |
| Final pH | 12.13 | 12.12 |
| Run time (min) | 180 | 180 |
| NaOH (ml) | 2 | 2.5 |

Figure 2:
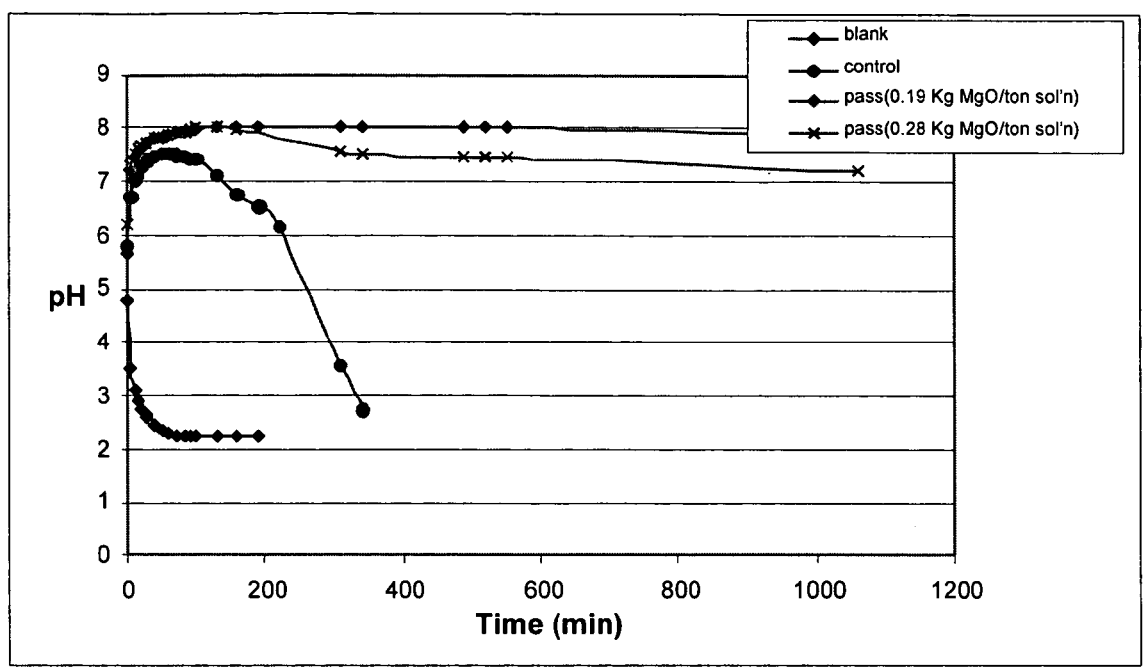
FIG. 2 shows passivation of weathered rock as a function of MgO addition.

These experiments were repeated using less permanganate (0.04 Kg/ton instead of 0.05 Kg/ton) and the results can be seen in FIG. 2. Very good reproducibility was obtained at the lower permanganate dosage. Experiments were then conducted with lower and higher additions of MgO and at different concentrations of permanganate. These results are given in FIG. 3. As can be noted, the pH decreased after about 120 minutes when 0.08 Kg MgO/ton solution was added even at much higher permanganate dosage. Passivation is obtained with 0.33 Kg MgO/ton and 0.61 Kg MgO/ton solution.

TABLE 2

Configuration for Figure 2

| Sample | Passivation (0.19 Kg MgO/ton solution) | Passivation (0.28 Kg MgO/ton solution) |
|---|---|---|
| $KMnO_4$ Kg/ton | 0.04 | 0.04 |
| CaO Kg/ton | 0.64 | 0.64 |
| MgO Kg/ton | 0.19 | 0.28 |
| Initial pH | 11.56 | 11.5 |
| Final pH | 12.11 | 12.12 |
| Run time (min) | 180 | 180 |
| NaOH (ml) | 1.3 | 1.3 |

TABLE 3

Figure 3:
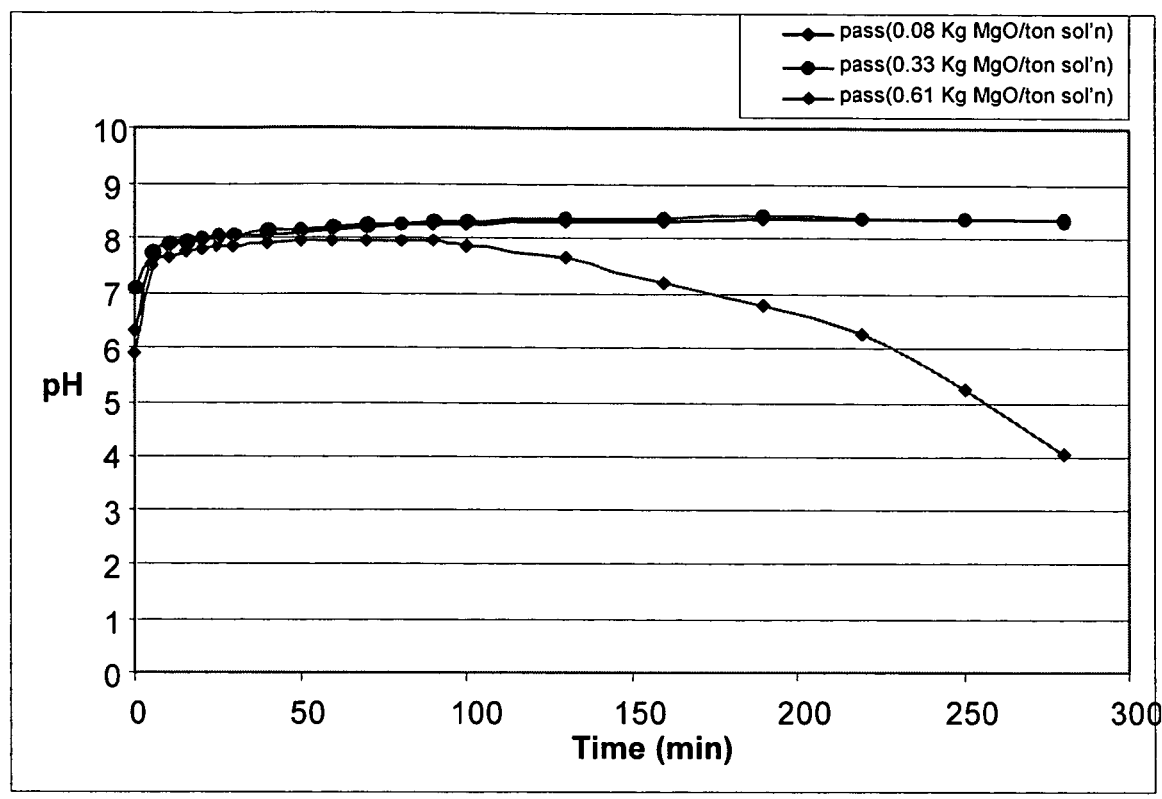
FIG. 3 shows passivation of weathered rock with 0.06 Kg MgO/ton solution, 0.33 Kg MgO/ton solution and 0.61 Kg MgO/ton solution.

Conditions for FIG. 3

| Sample | Passivation (0.08 Kg MgO/ton solution) | Passivation (0.33 Kg MgO/ton solution) | Passivation (0.61 Kg MgO/ton solution) |
|---|---|---|---|
| $KMnO_4$ Kg/ton | 0.06 | 0.05 | 0.05 |
| CaO Kg/ton | 0.45 | 0.61 | 0.55 |
| MgO Kg/ton | 0.08 | 0.33 | 0.61 |
| Initial pH | 12.08 | 12.05 | 12.05 |
| Final pH | 12.09 | 12.15 | 12.02 |
| Run time (min) | 180 | 180 | 180 |
| NaOH (ml) | 1.1 | 0.7 | 0.5 |

The necessity of $KMnO_4$ and CaO addition was examined next. Passivation is obtained when the MgO addition is 0.08 Kg/ton and higher, even in the absence of CaO; see FIG. 4.

Figure 5:
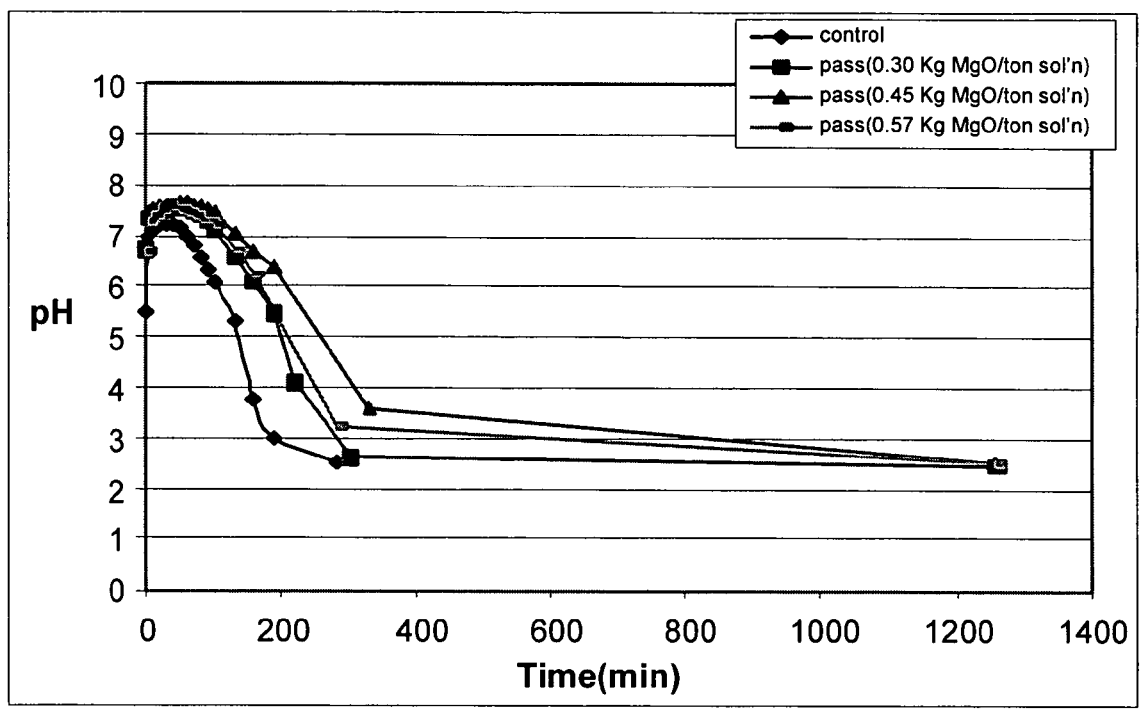
FIG. 5 shows control and passivation of fresh rock as a function of MgO additions in the absence of $KMnO_4$ and CaO addition.
Figure 6:
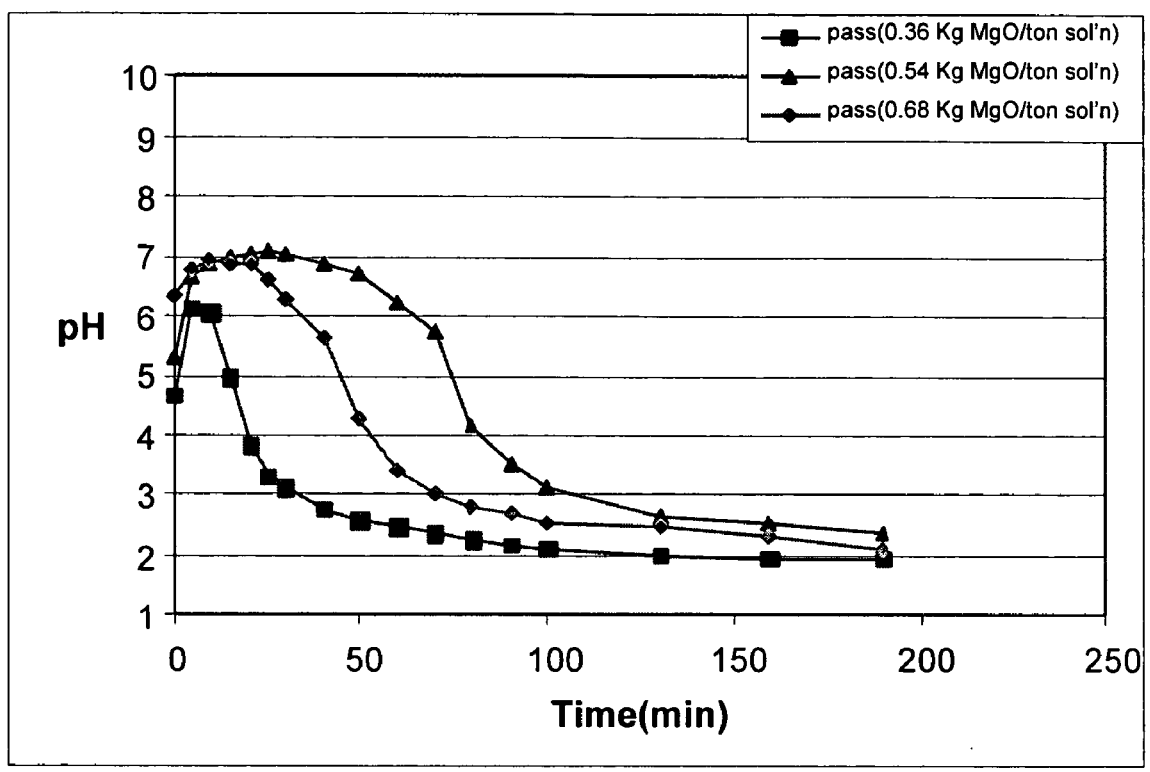
FIG. 6 shows passivation in the absence of $KMnO_4$

In the absence of $KMnO_4$ and CaO, passivation is not achieved with 0.30 Kg MgO/ton solution, 0.45 Kg MgO/ton solution, and 0.57 Kg MgO/ton solution (see FIG. 5). The addition of lime with these same levels of MgO did not result in passivation in the absence of permanganate (FIG. 6).

TABLE 4

Figure 4:
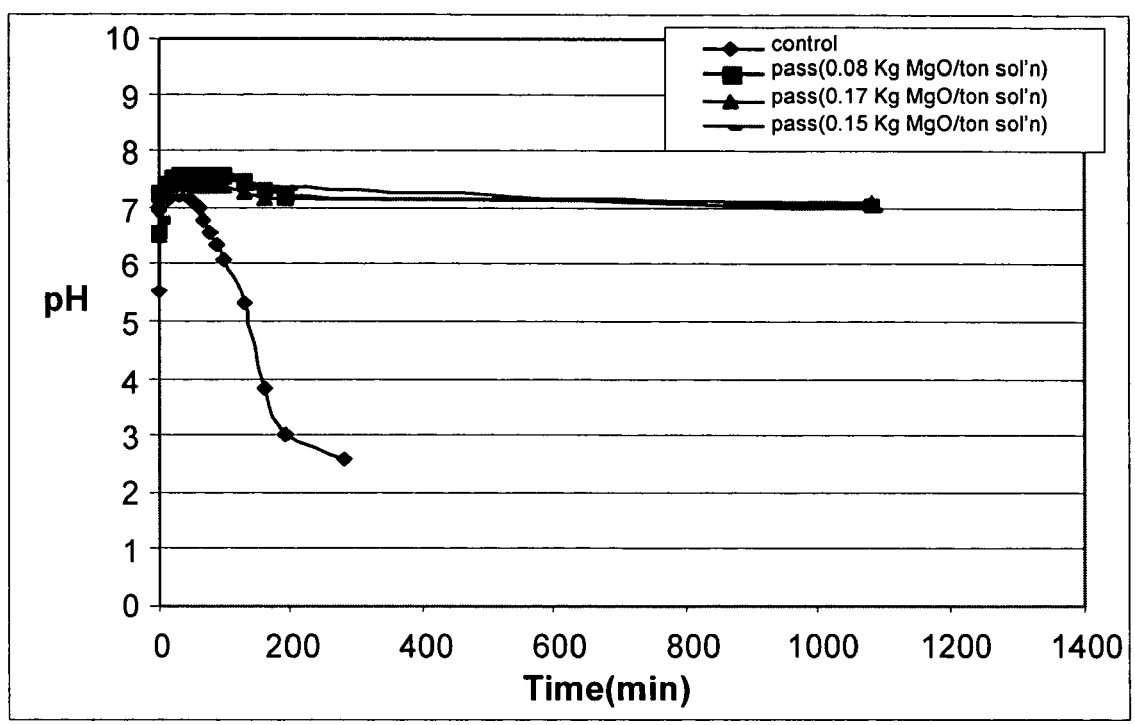
FIG. 4 shows passivation in the absence of CaO.

Conditions for FIG. 4

| Sample | Control | Passivation (0.08 Kg MgO/ton solution) | Passivation (0.17 Kg MgO/ton solution) | Passivation (0.15 Kg MgO/ton solution) |
|---|---|---|---|---|
| $KMnO_4$ Kg/ton | | 0.07 | 0.06 | 0.07 |
| CaO Kg/ton | | | | |
| MgO Kg/ton | | 0.08 | 0.17 | 0.15 |
| Initial pH | 7.63 | 11.53 | 11.5 | 11.94 |
| Final pH | 12.07 | 12.08 | 12.07 | 12.07 |
| Run time (min) | 180 | 180 | 180 | 180 |
| NaOH (ml) | 2.8 | 5 | 2 | 3 |

TABLE 5

Conditions for FIG. 5

| Sample | Control | Passivation (0.30 Kg MgO/ton solution) | Passivation (0.45 Kg MgO/ton solution) | Passivation (0.57 Kg MgO/ton solution) |
|---|---|---|---|---|
| $KMnO_4$ Kg/ton | | | | |
| CaO Kg/ton | | | | |
| MgO Kg/ton | | 0.30 | 0.45 | 0.57 |
| Initial pH | 7.63 | 11.52 | 12.16 | 12.2 |
| Final pH | 12.07 | 12.09 | 12.02 | 12.1 |
| Run time (min) | 180 | 180 | 180 | 180 |
| NaOH (ml) | 2.8 | 4 | 4.5 | 4 |

TABLE 6

Conditions for FIG. 6

| Sample | Passivation (0.36 Kg MgO/ton solution) | Passivation (0.54 Kg MgO/ton solution) | Passivation (0.68 Kg MgO/ton solution) |
|---|---|---|---|
| $KMnO_4$ Kg/ton | | | |
| CaO Kg/ton | 1.81 | 1.48 | 1.48 |
| MgO Kg/ton | 0.36 | 0.54 | 0.68 |
| Initial pH | 8.60 | 11.37 | 11.48 |
| Final pH | 10.05 | 10.38 | 10.12 |
| Run time (min) | 180 | 180 | 180 |
| NaOH | As needed | As needed | As needed |

Figure 7:
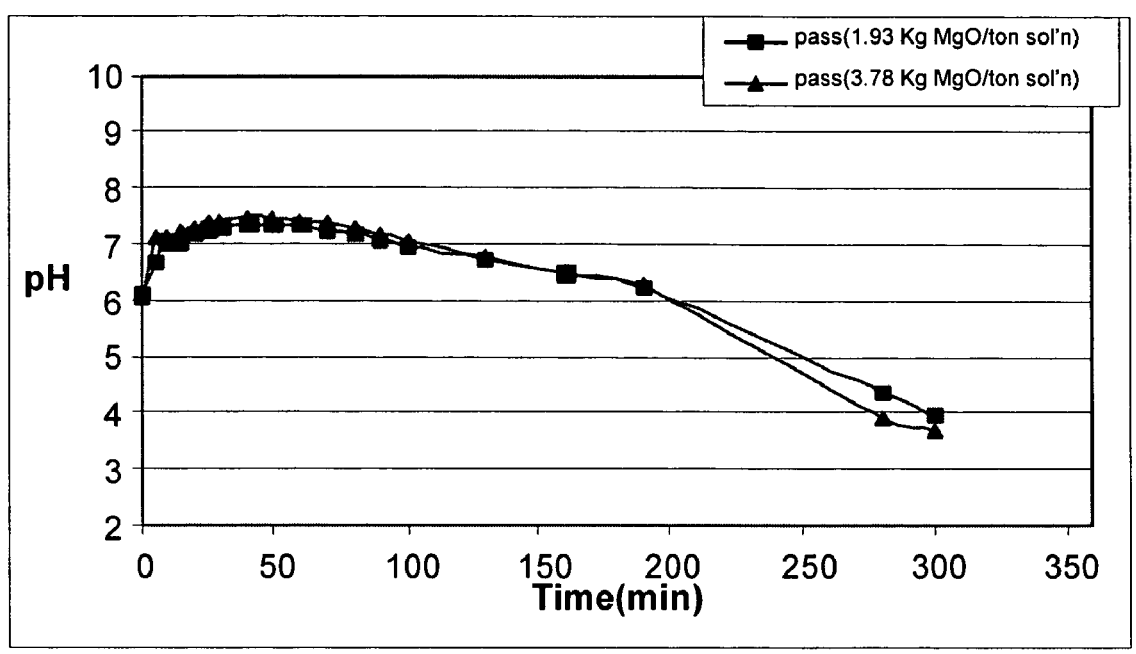
FIG. 7 shows passivation experiments with MgO in the absence of permanganate and lime.

In the absence of permanganate and lime, passivation was nearly achieved with relatively-large additions of MgO, i.e. 1.93 and 3.78 Kg/ton MgO (FIG. 7).

TABLE 7

Conditions for FIG. 7

| Sample | Passivation (1.93 Kg MgO/ton solution) | Passivation (3.78 Kg MgO/ton solution) |
|---|---|---|
| KMnO$_4$ Kg/ton | | |
| CaO Kg/ton | | |
| MgO Kg/ton | 1.93 | 3.78 |
| Initial pH | 11.83 | 12.20 |
| Final pH | 12.09 | 12.10 |
| Run time (min) | 180 | 180 |
| NaOH (ml) | 3.5 | 4 |

Figure 8:
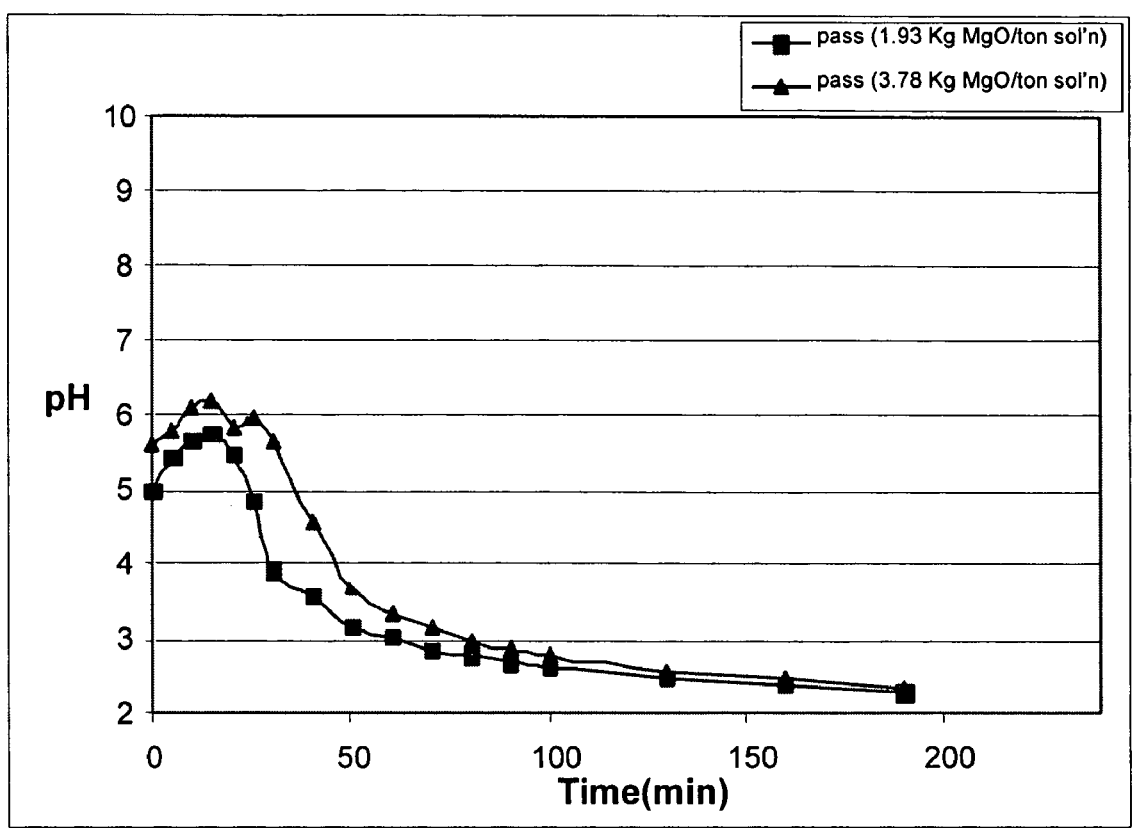
FIG. 8 shows passivation experiments in the absence of $KMnO_4$.

Passivation fails quickly for the weathered rock from the Golden Sunlight mine in the absence of KMnO$_4$ with MgO additions of 1.93 Kg/ton and 3.78 Kg/ton, even in the presence of CaO when the pH is below 12 (FIG. 8).

TABLE 8

Conditions for FIG. 8

| Sample | Passivation (1.93 Kg MgO/ton solution) | Passivation (3.78 Kg MgO/ton solution) |
|---|---|---|
| KMnO$_4$ Kg/ton | | |
| CaO Kg/ton | 0.68 | 0.77 |
| MgO Kg/ton | 1.93 | 3.78 |
| Initial pH | 11.61 | 8.64 |
| Final pH | 10.83 | 10.43 |
| Run time (min) | 180 | 180 |
| NaOH | As needed | As needed |

Figure 9:
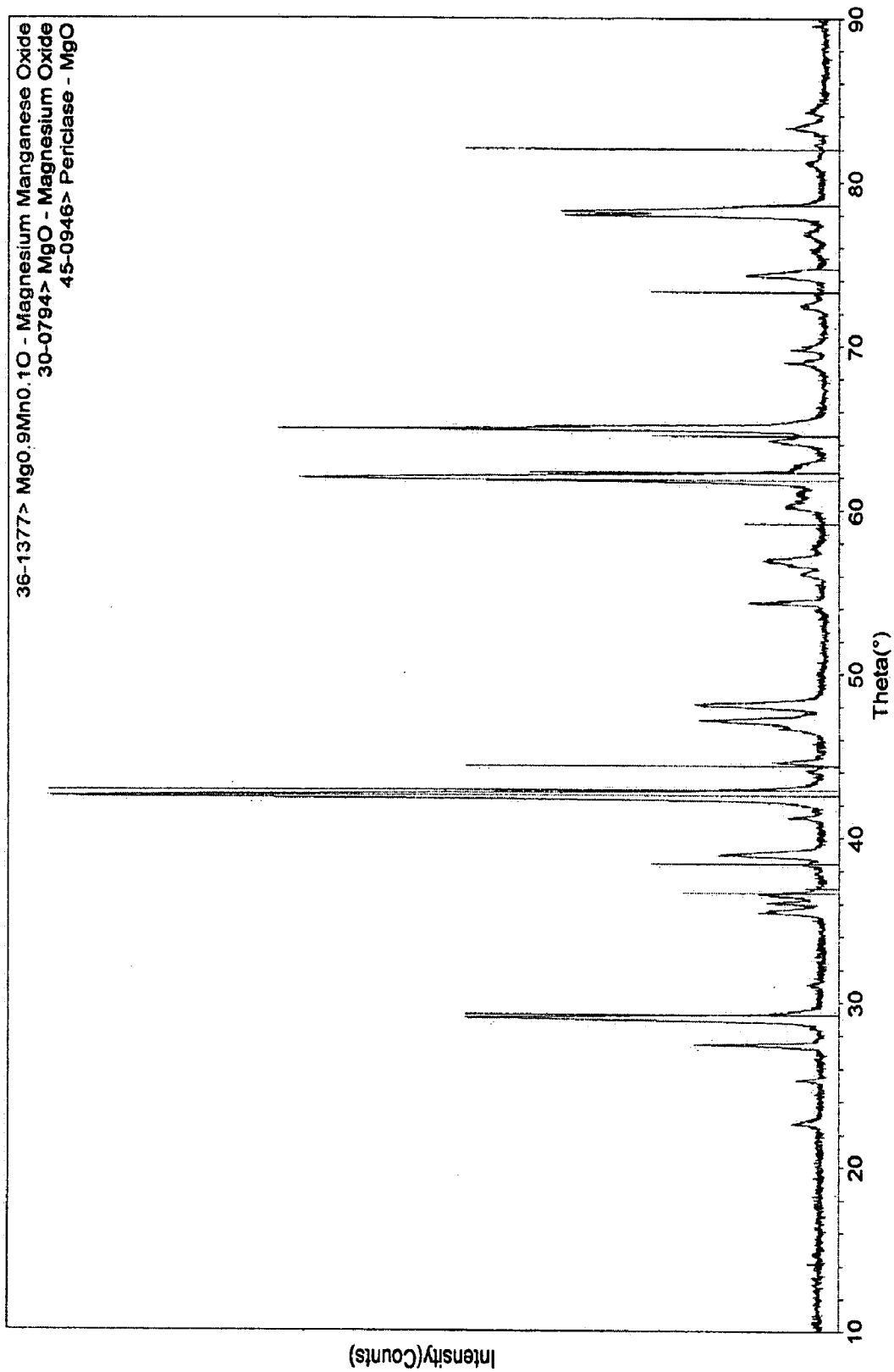
FIG. 9 shows the X-ray pattern of precipitate formed when potassium permanganate, magnesium oxide, and calcium oxide are combined at high pH.

An experiment was conducted to establish the composition of the precipitate that is formed when potassium permanganate, magnesium oxide, and calcium oxide are combined at high pH. In this case 2.08 Kg CaO/ton solution, 0.09 Kg MgO/ton solution, 20-ml DI water, and 0.08 Kg KMnO$_4$/ton solution were combined at pH 12 in the absence of rock sample. The mixture was conditioned for three hours, and the precipitate was separated from solution using an ultracentrifuge. The solid was air-dried, and an x-ray diffraction pattern was obtained. This pattern is given in FIG. 9. The solids present under these conditions are: Mg$O_{0.90}$Mn$O_{0.10}$, MgO and periclase, MgO.

Manganese Salt Addition

Figure 10:
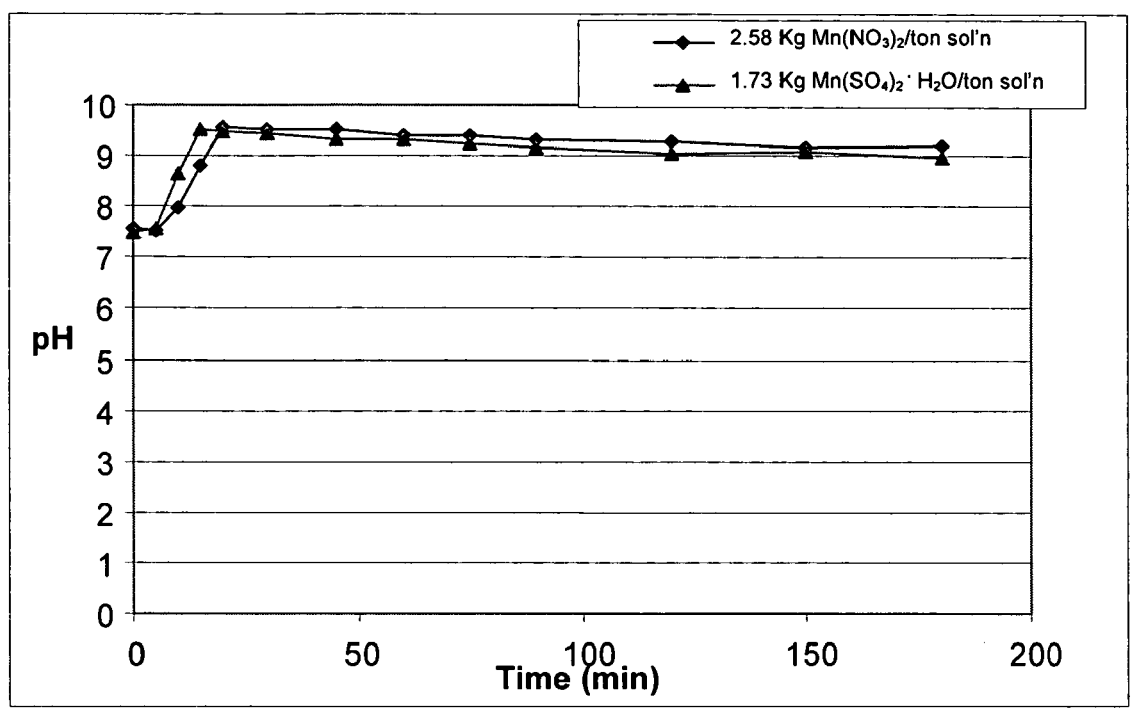
FIG. 10 shows passivation using manganous nitrate and sulfate.

Since the solid noted in the permanganate series of experiments was a manganous compound, experiments were run to determine whether manganous salt additions would result in passivation. Manganous nitrate and sulfate were both investigated. The initial experiments were conducted with relatively-high additions of both salts. The composition of the manganous salt did not make a difference (FIG. 10). Manganous sulfate was selected for use in subsequent tests.

TABLE 9

Conditions for FIG. 10

| Sample | Passivation (1.73 Kg Mn(SO$_4$)$_2$.H$_2$O/ton solution) | Passivation (2.58 Kg Mn(NO$_3$)$_2$/ton solution) |
|---|---|---|
| CaO Kg/ton | 0.26 | 0.26 |
| MgO Kg/ton | 0.21 | 0.21 |
| Target pH | 10.5 | 10.5 |
| Mn(SO$_4$)$_2$.H$_2$O (Kg/ton) | 1.73 | |
| Mn(NO$_3$)$_2$ (Kg/ton) | | 2.58 |
| Run time (min) | 180 | 180 |
| NaOH | As needed | As needed |

The effect of the amount of manganous sulfate addition was examined. Manganese additions of 1.46, 1.19, 0.93 and 0.56 Kg/ton were made with constant additions of CaO and MgO. Passivation occurred when 1.46 and 1.19 Kg/ton of manganous sulfate was used (FIG. 11).

TABLE 10

Figure 11:
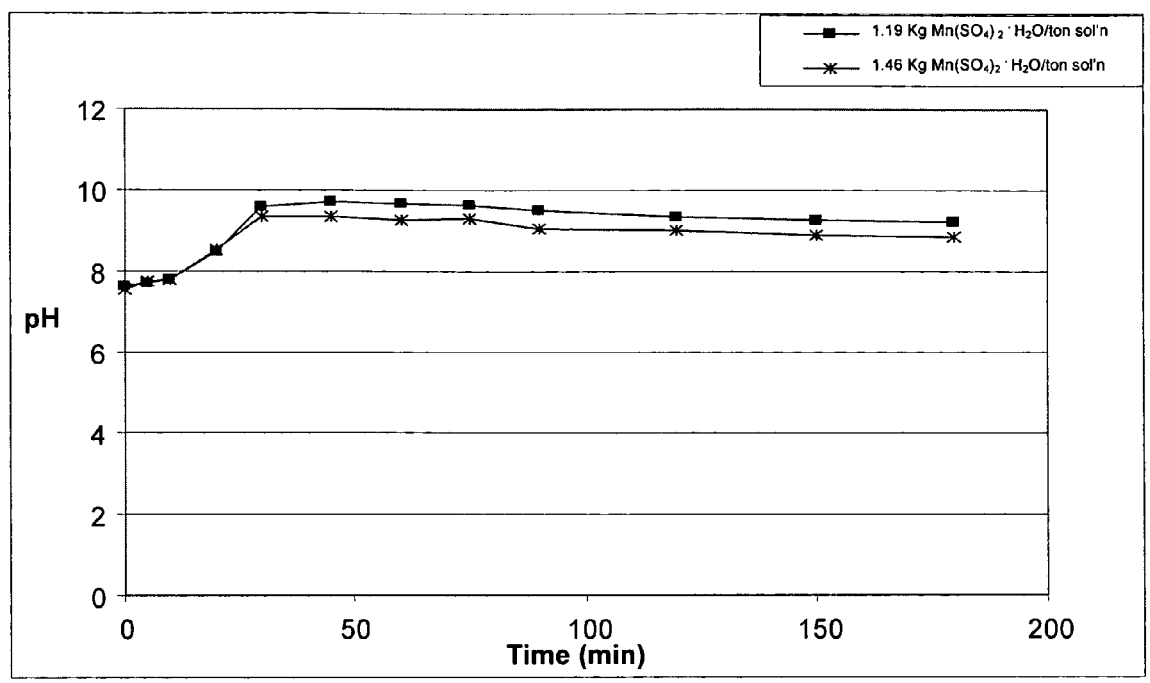
FIG. 11 shows passivation of rock with 1.19 Kg $Mn(SO_4)_2 \cdot H_2O$/ton solution and 1.46 Kg $Mn(SO_4)_2 \cdot H_2O$/ton solution.

Conditions for FIG. 11

| Sample | Passivation (1.19 Kg Mn(SO$_4$)$_2$.H$_2$O/ton sol'n) | Passivation (1.46 Kg Mn(SO$_4$)$_2$.H$_2$O/ton sol'n) |
|---|---|---|
| CaO Kg/ton | 0.39 | 0.32 |
| MgO Kg/ton | 0.31 | 0.26 |
| Target pH | 10.5 | 10.5 |
| Mn(SO$_4$)$_2$.H$_2$O Kg/ton | 1.19 | 1.46 |
| Run time (min) | 180 | 180 |
| NaOH | As needed | As needed |

Figure 12:
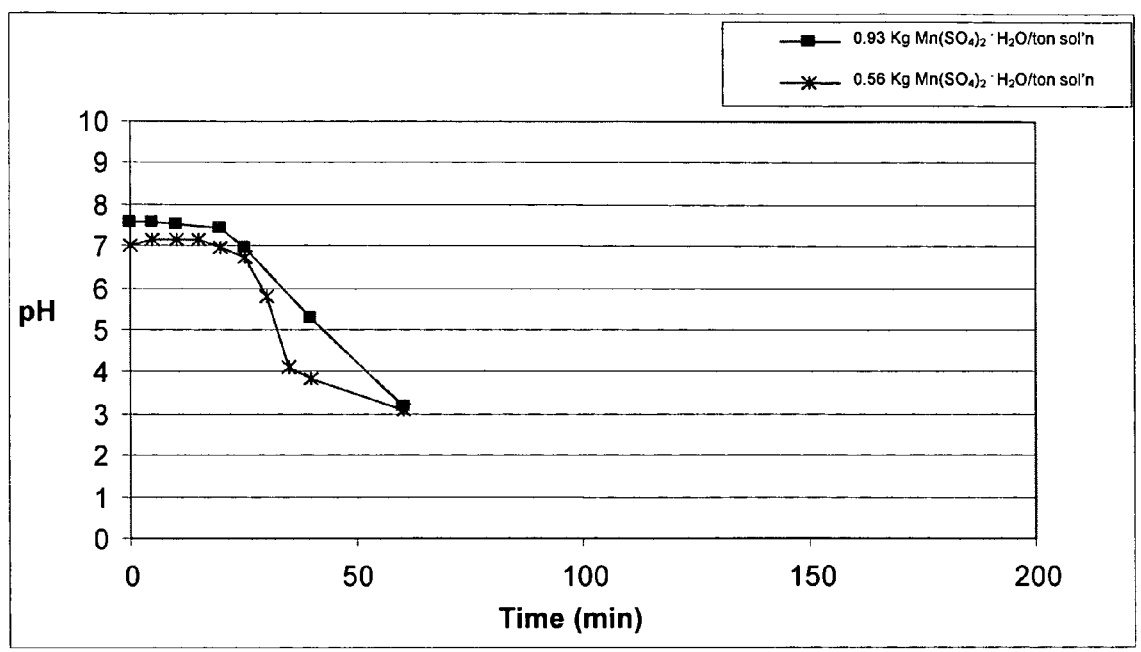
FIG. 12 shows passivation experiments with various additions of $MnSO_4$.

Passivation did not occur with manganous sulfate additions of 0.56 Kg/ton and 0.93 Kg/ton, however (FIG. 12).

TABLE 11

Conditions for FIG. 12

| Sample | Passivation (0.56 Kg Mn(SO$_4$)$_2$.H$_2$O/ton sol'n) | Passivation (0.93 Kg Mn(SO$_4$)$_2$.H$_2$O/ton sol'n) |
|---|---|---|
| CaO Kg/ton | 0.54 | 0.45 |
| MgO Kg/ton | 0.44 | 0.36 |
| Target pH | 10.5 | 10.5 |
| Mn(SO$_4$)$_2$.H$_2$O (Kg/ton) | 0.56 | 0.93 |
| Run time (min) | 180 | 180 |
| NaOH | As needed | As needed |

Figure 13:
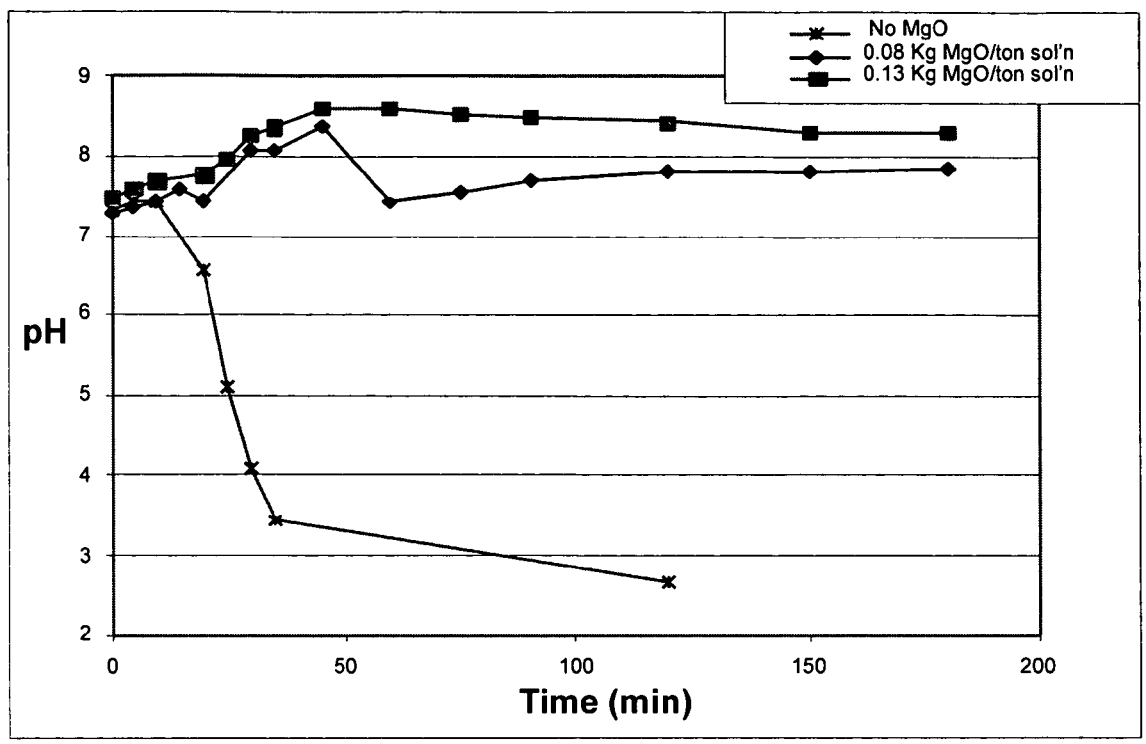
FIG. 13 shows passivation experiments as a function of MgO addition.

No passivation is effected in the absence of MgO but was obtained with the small addition of 0.08 Kg MgO/ton solution (FIG. 13).

TABLE 12

Conditions for FIG. 13

| Sample | Pass (no MgO) | Pass (0.08 Kg MgO/ton solution) | Pass (0.13 Kg MgO/ton solution) |
|---|---|---|---|
| CaO Kg/ton | 0.39 | 0.39 | 0.39 |
| MgO Kg/ton | 0 | 0.08 | 0.13 |
| Target pH | 10.5 | 10.5 | 10.5 |
| Mn(SO$_4$)$_2$.H$_2$O (Kg/ton) | 1.19 | 1.19 | 1.19 |
| Run time (min) | 180 | 180 | 180 |
| NaOH | As needed | As needed | As needed |

Experiments were also conducted with additions of 2.07 Kg MgO/ton solution and 2.59 Kg MgO/ton solution. Passivation was achieved with both of these additions (FIG. 14).

TABLE 13

Figure 14:
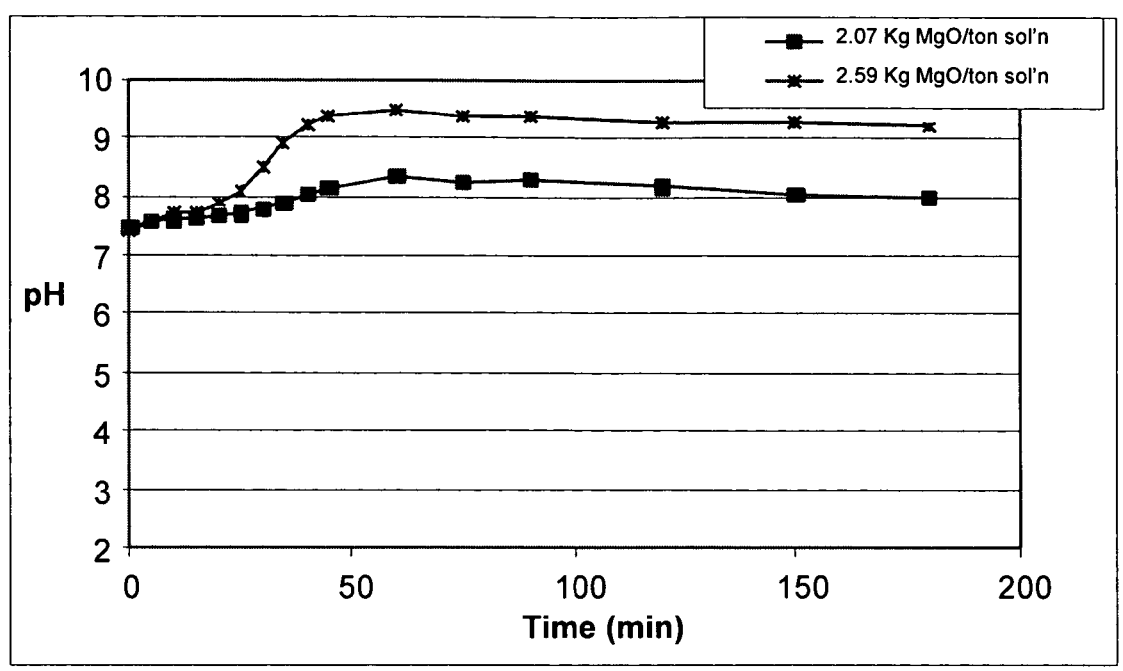
FIG. 14 shows passivation experiments as a function of MgO additions

Conditions for FIG. 14

| Sample | Passivation (2.07 Kg MgO/ton solution) | Passivation (2.59 Kg MgO/ton solution) |
|---|---|---|
| CaO Kg/ton | 0.39 | 0.39 |
| MgO Kg/ton | 2.07 | 2.59 |
| Target pH | 10.5 | 10.5 |
| $Mn(SO_4)_2.H_2O$ (Kg/ton) | 1.19 | 1.19 |
| Run time (min) | 180 | 180 |
| NaOH | As needed | As needed |

Figure 15:
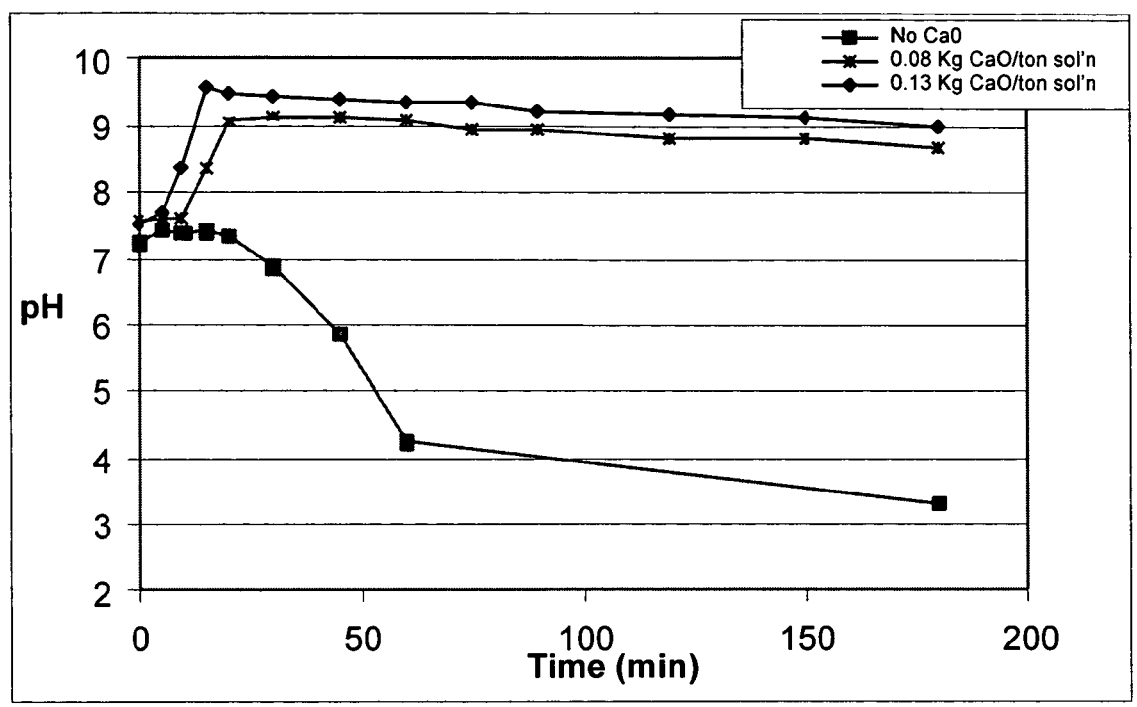
FIG. 15 shows passivation experiments as a function of CaO addition.

As shown in FIG. 15, when 0.31 Kg MgO/ton solution and 1.19 Kg manganous sulfate/ton solution are present, passivation was not achieved in the absence of CaO. Passivation was achieved in the presence of 0.08 Kg/ton and 0.13 Kg/ton CaO, however.

TABLE 14

Conditions for FIG. 15

| Sample | Pass (no CaO) | Pass (0.08 Kg/ton CaO) | Pass (0.13 Kg/ton CaO) |
|---|---|---|---|
| CaO Kg/ton | 0 | 0.08 | 0.13 |
| MgO Kg/ton | 0.31 | 0.31 | 0.31 |
| Target pH | 10.5 | 10.5 | 10.5 |
| $Mn(SO_4)_2.H_2O$ Kg/ton | 1.19 | 1.19 | 1.19 |
| Run time (min) | 180 | 180 | 180 |
| NaOH | As needed | As needed | As needed |

Figure 16:
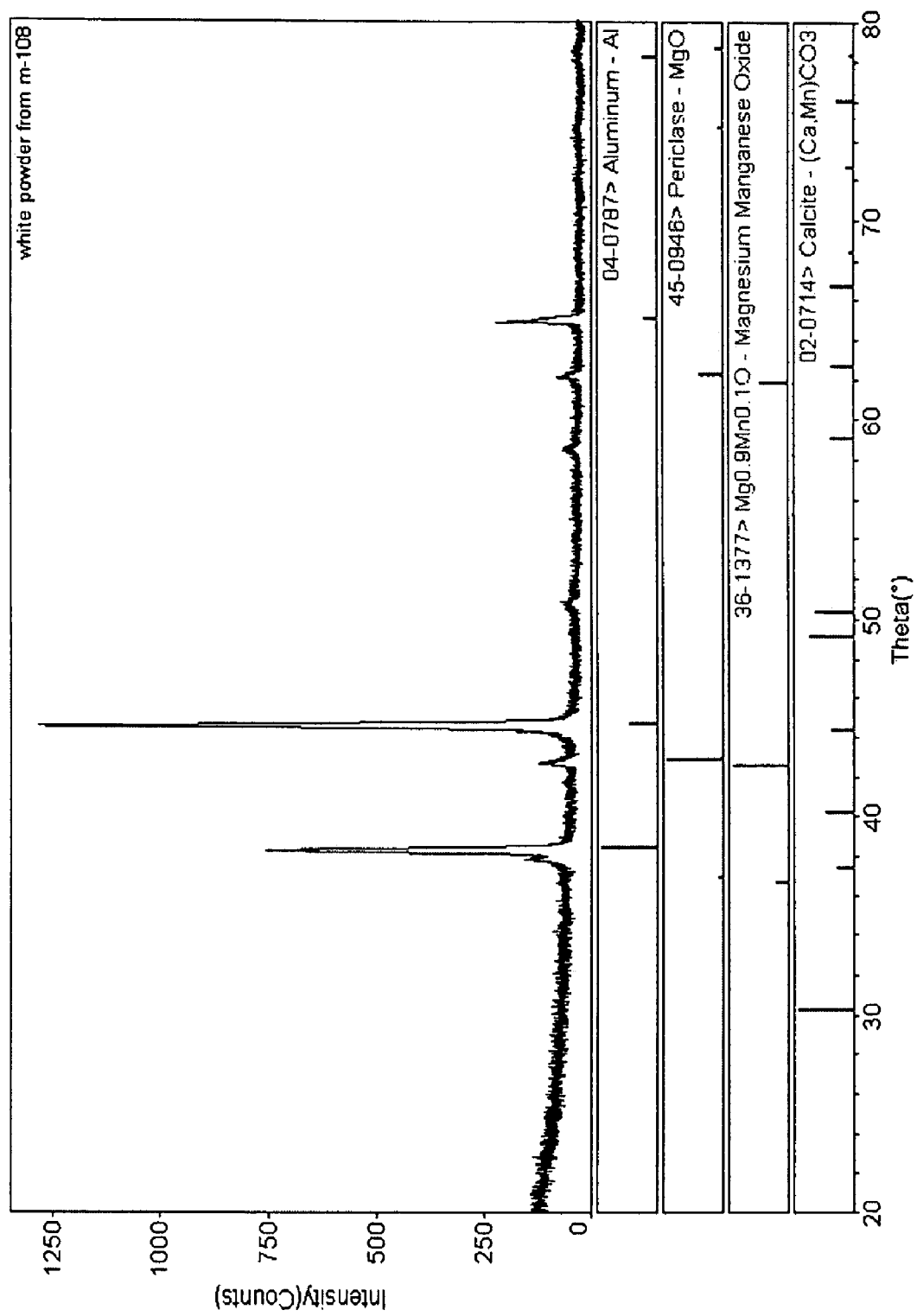
FIG. 16 shows the data base for the light colored powder.
Figure 17:
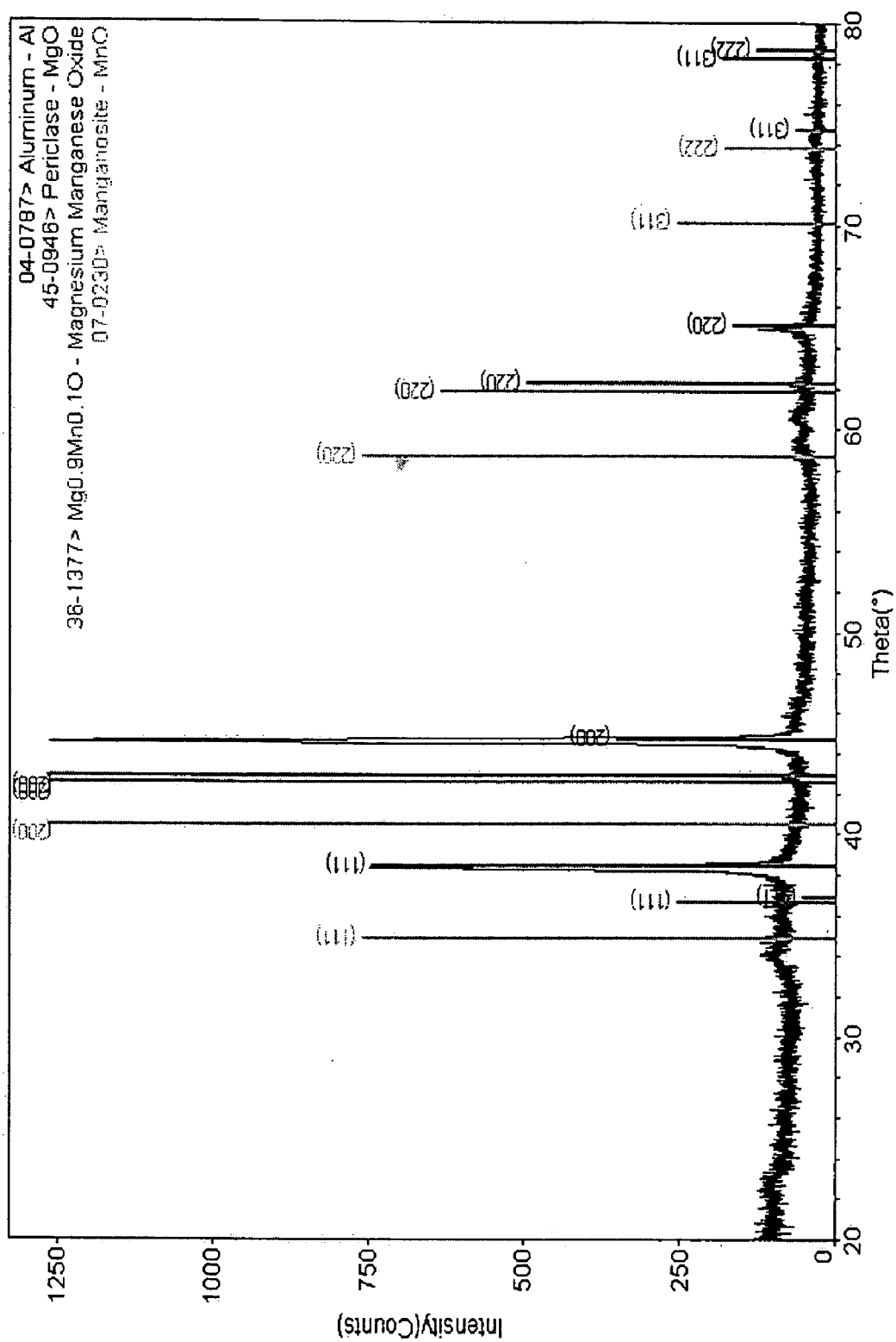
FIG. 17 shows the X-ray diffraction pattern for the light powder.

X-Ray Diffraction Experiments:

An experiment was conducted to establish the composition of the precipitate that is formed when manganous sulfate, magnesium oxide, and calcium oxide are combined at pH 10.5. In this case a solution of 1.19 Kg $Mn(SO_4)_2 \cdot H_2O$/ton solution, 0.39 Kg CaO/ton solution, 0.31 Kg MgO/ton solution, and 20-ml DI water was prepared in the absence of a rock sample. The mixture was conditioned for three hours, and the precipitate was separated from solution using an ultracentrifuge. The solid was air dried. The air dried solid contained a light colored powder and a dark colored powder. An x-ray diffraction pattern was obtained for each powder. The database for the light colored powder is shown in FIG. 16, and the x-ray diffraction pattern for the light colored power is shown in FIG. 17. The x-ray pattern (FIG. 17) indicates the presence of the following solids:

$MgO_{0.90}MnO_{0.10}$

Periclase-MgO

Manganiferrous calcite-$(Ca,Mn)CO$

Figure 18:
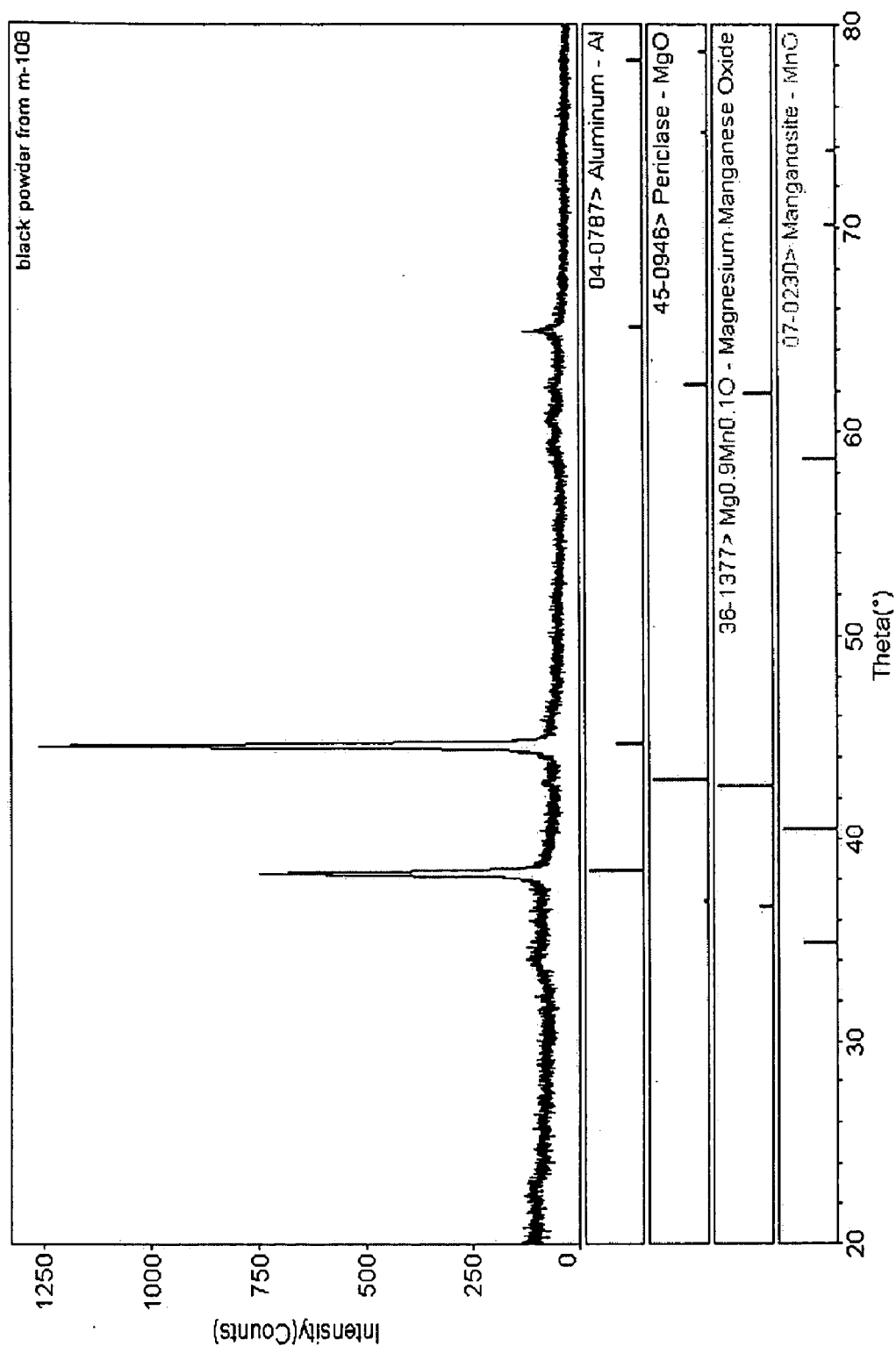
FIG. 18 shows the data base for the dark color powder.
Figure 19:
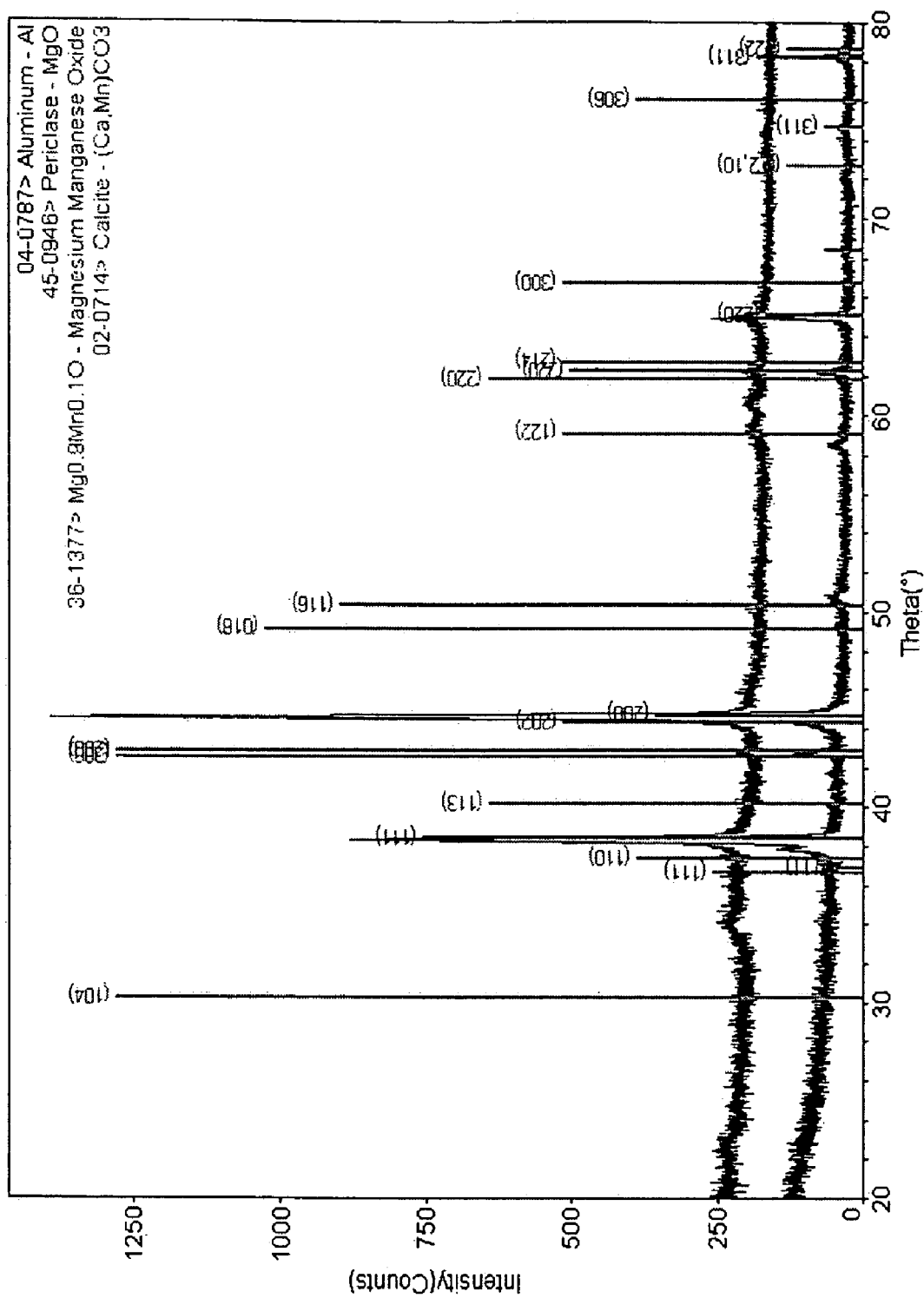
FIG. 19 shows the x-ray diffraction pattern for the dark color powder.

The database for the dark colored powder is shown in FIG. 18, and the x-ray diffraction pattern for this power is shown in FIG. 19. The x-ray pattern indicates the presence of the following solids:

$MgO_{0.90}.MnO_{0.10}$

Periclase-MgO

Manganosite (MnO)

Eh Measurements of Pyrite:

A passivation solution was prepared under the conditions shown in Table 15.

The Eh of the solution was measured to be 70 mv.

A 30-g sample of Golden Sunlight fresh rock (¼ in. passing) was added to the solution, and the Eh was monitored for three hours. See FIG. 20.

TABLE 15

Figure 20:
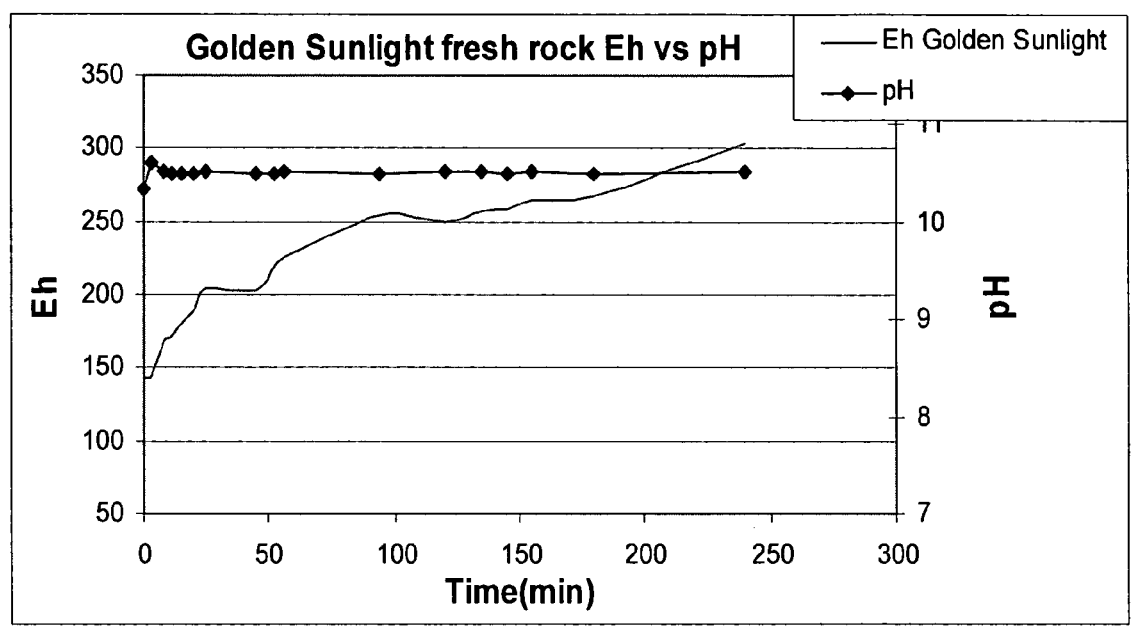
FIG. 20 shows Eh measurements for Golden sunlight fresh rock in passivation solution.

Conditions for FIG. 20

| Ore type | Ore | DI water | CaO | MgO | $MnSO_4$ | pH |
|---|---|---|---|---|---|---|
| Golden Sunlight | 30 g | 60-ml | 0.39 Kg/ton | 0.31 Kg/ton | 1.19 Kg/ton | 10.5 |

In the case of weathered rock, sample preparation involved screening and washing the sample to remove the weathering products (soluble products and very small particles) from the surface of the rock. This was done because the pH did not lower when testing the control sample with hydrogen peroxide in the control experiment. Fresh rock did not pose such a problem and was used as is.

The weathering product is primarily jarosite, basic iron sulfate.

REFERENCES

Caruccio, F. T., Geidel, G., Pelletier, M., "Occurrence and predication of acid drainage". *J. of the Energy Division, ASCE*, 107, No. 1, pp. 167, 1981.

De Vries, Nadine H. C. Process for Treating Iron-Containing Sulfide Rocks and Ores, U.S. Pat. No. 5,587,001, 1996.

Doyle, F. M. and Mirza, A. H., "Understanding the mechanisms and kinetics of pyrite wastes". *Proceedings of the Western Regional Symposium on Mining and Mineral Processing*, Doyle, F. M. (eds.), Society of Mining Engineering. 1990.

Evangelou, V. P., "Pyrite Chemistry: The Key for Abatement of Acid Mine Drainage". *Acidic Mining Lakes: Acid mine Drainage, Limnology and Reclamation* Springer-Verlag, 1998.

Huang, X. and Evangelou, V. P., Abatement of acid mine drainage by encapsulation of acid producing geological materials, US Bureau of Mines, Contract No. J0309013, 1992.

Kleinmann, R. L. P., "Acid mine drainage: US Bureau of Mines researches and develops control methods for both coal and metal mines". *Enviro. Mining J.*, July, pp 161-164, 1989.

Marshall, G. P., J. S. Thompson, and R. E. Jenkins, "New technology for the prevention of acid rock drainage". *Proceedings of the Randol Gold and Silver Forum*, pp. 203-206, 1998.

Sobek, A. A., Schuller, W. A., Freeman, J. R., and Smith, R. M., Field and laboratory methods applicable to overburden mine soils. EPA 600/2-78-054, pp 203, 1978.

Arnold, D. E., 1991, Diversion wells—A low-cost approach to treatment of acid mine drainage, In: Proceedings of the 12th Annual West Virginia Surface Mine Drainage Task Force Symposium, Morgantown, W. Va., April 3-4.

Chen, Songyuan, 2001, Control of acid mine drainage by passivation of reactive acid generating materials, A dissertation for the degree of Doctor of Philosophy in Metallurgical Engineering, University of Nevada, Reno, 107 pp.

Enviromine, 2003, http://technology.infomine.com/enviromine/, Accessed March, 2003.

Evangelou, V. P. (Bill), 1995, *Pyrite oxidation and its control*, CRC press, 293 pp.

Evangelou, V. P. (Bill), Seta, Ananto K., 1998, "Acid mine drainage" Encyclopedia of Environmental Analysis and Remediation, John Wiley and Sons, Inc., pp 1-17.

Lewis, C. J., and Boynton, R. S., 1995, Acid neutralization with lime for environmental control and manufacturing processes: Arlington, Va., National Lime Association, 16 pp.

Mehta, R., Chen, S., Misra, M., 2000, "Development of a process to prevent acid generation from waste rock and mine tailings", *Environmental Issues and Management of Waste and Mineral Production*, R. K. Singhal and A. K. Mehrota (Eds.) Balkema, pp. 577-580.

Paredes, Maria M., (1994) A fluid inclusion isotope and multi-element study of the Golden Sunlight Deposit, Montana, A thesis for the degree of Master of Science, Iowa State University.

Parisi, D., Horneman, J. and V. Rastogi, 1994, Use of bactericides to control acid mine drainage from surface operations. In: Proceedings of the $3^{rd}$ International Conference on the Abatement of Acidic Drainage, Volume 1. Pittsburgh, Pa., pp. 319-325

Parker, G. and Robertson, A., 1999, Acid drainage. Australian Minerals and Energy Environment Foundation Occasional Paper Number 11, Australian Minerals and Energy Environment Foundation, Melbourne, 227 pp.

www.placerdome.com, 2003, http://www.placerdome.com/properties/goldensunlight/goldensun.html, accessed March 2003.

Rastogi, V., 1996, Water quality and reclamation management in mining using bactericides. Mining Engineering, 48: pp. 71-76.

Sengupta, M., 1993, Environmental impacts of mining: monitoring, restoration, and control. Lewis Publishers, New York, 494 pp.

Singer, P. C. and Stumm, W., 1970, Acidic mine drainage: the rate-determining step, *Science,* 167, p. 1121.

Skousen, J., Rose, A., Geidel, G., Foreman, J., Evans, R., Hellier, W., 1998, Handbook of technologies for avoidance and remediation of acid mine drainage, The National Mine Land Reclamation Center, Morgantown, W.Va., 131 pp.

Skousen, J. G and Ziemkiewicz, P. F., 1996, Acid Drainage: control and treatment: Morgantown, W.Va., West Virginia University and the National Mine Land Reclamation Center, 361 pp.

Stumm, W. and Morgan, J. J., 1970, *Aquatic Chemistry*, John Wiley and Sons, New York.

Thompson, Jeffery S., Marshall, Gary P., 1998, Dupont passivation technology chemistry and application, Internal Dupont publication.

All numerical ranges given herein include all useful intermediate ranges and individual values thereof. Useful ranges and values may be determined using the teachings herein and those known in the art without undue experimentation. Useful chemical equivalents may be used for those chemicals specifically exemplified in this disclosure, as known by one of ordinary skill in the art without undue experimentation.

All references cited herein are hereby incorporated by reference to the extent not inconsistent with the disclosure herein. Although the description herein contains many specificities, these are not to be construed as limiting the scope of the invention, but as merely providing illustrations of some of the presently-preferred embodiments of the invention. For example, magnesium may be in the form of magnesium oxide, or other forms, as known in the art. The magnesium-, manganese- and calcium-containing substances may be different chemical species than described herein, as known in the art. In addition, the reaction time may be different than specifically shown. Thus, the scope of the invention should be determined by the appended claims and their legal equivalents, rather than by the examples given.

We claim:

1. A method of reducing acid rock drainage from sulfidic iron-containing rock comprising the steps of:
    contacting said rock with a system comprising a magnesium-containing substance at a concentration of at least about 0.08 kg/ton solution, a manganese-containing substance which is manganous nitrate or manganous sulfate at a concentration of at least about 0.08 kg/ton solution, and a calcium-containing substance at a concentration of at least about 0.08 kg/ton solution; and adjusting the pH of the system to below about 11.

2. The method of claim 1, wherein the magnesium-containing substance is one or more members of the group consisting of: magnesium oxide, magnesium hydroxide, magnesium chloride, magnesium nitrate and magnesium carbonate.

3. The method of claim 2, wherein the magnesium-containing substance is MgO.

4. The method of claim 1, wherein the calcium-containing substance is one or more members of the group consisting of: a calcium halide, a calcium oxide, and a calcium nitrate.

5. The method of claim 4, wherein the calcium-containing substance is calcium oxide.

6. The method of claim 1, wherein the concentration of manganous containing substance is at least about 1 kg/ton solution.

7. The method of claim 1, wherein said rock is present in a slurry of 20-50% by weight of solids.

\* \* \* \* \*